(12) United States Patent
Khoshnevisan et al.

(10) Patent No.: US 11,356,954 B2
(45) Date of Patent: Jun. 7, 2022

(54) HYBRID AUTOMATIC REPEAT REQUEST (HARQ) HANDLING FOR DISCONTINUOUS RECEPTION

(71) Applicant: QUALCOMM Incorporated, San Diego, CA (US)

(72) Inventors: Mostafa Khoshnevisan, San Diego, CA (US); Xiaoxia Zhang, San Diego, CA (US); Ozcan Ozturk, San Diego, CA (US); Jing Sun, San Diego, CA (US); Kapil Bhattad, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/904,278

(22) Filed: Jun. 17, 2020

(65) Prior Publication Data

US 2021/0029641 A1    Jan. 28, 2021

(30) Foreign Application Priority Data

Jul. 26, 2019   (IN) .............................. 201941030272

(51) Int. Cl.
*H04L 1/18*   (2006.01)
*H04W 28/04*   (2009.01)
*H04W 52/02*   (2009.01)

(52) U.S. Cl.
CPC ....... *H04W 52/0248* (2013.01); *H04L 1/1854* (2013.01); *H04L 1/1864* (2013.01); *H04W 28/04* (2013.01); *H04W 52/0216* (2013.01)

(58) Field of Classification Search
CPC ......... H04W 52/0248; H04W 52/0216; H04W 28/04; H04L 1/1864; H04L 1/1854
See application file for complete search history.

(56) References Cited

U.S. PATENT DOCUMENTS

2019/0052416 A1\*   2/2019   Babaei ................... H04L 1/188
2019/0097874 A1    3/2019   Zhou et al.
(Continued)

OTHER PUBLICATIONS

U.S. Appl. No. 62/842,354, filed May 2, 2019 [19-1092P].
(Continued)

*Primary Examiner* — Noel R Beharry
*Assistant Examiner* — M Mostazir Rahman
(74) *Attorney, Agent, or Firm* — Holland & Hart LLP/Qualcomm

(57) ABSTRACT

This disclosure provides systems, methods, and apparatuses, including computer programs encoded on computer storage media, for wireless communications and more specifically for handling hybrid automatic repeat request (HARQ) processes with discontinuous reception (DRX) operations. In some implementations, a user equipment (UE) may use a timer to maintain an ON duration in a DRX cycle based on receiving a downlink control information (DCI) message with a data-to-feedback timing indicator (for example, a K1 value) indicating a non-numeric value for a data message. For example, the UE may receive a DCI message with feedback timing for the data message based on maintaining the ON duration. In some other implementations, a UE may use a timer to maintain an ON duration following a feedback opportunity to support dynamic group-based HARQ messaging. For example, the UE may receive a DCI message requesting a retransmission of feedback information based on maintaining the ON duration.

28 Claims, 14 Drawing Sheets

(56) References Cited

U.S. PATENT DOCUMENTS

2019/0132862 A1* 5/2019 Jeon .................. H04L 5/0064
2020/0260304 A1* 8/2020 Zhou ................ H04W 52/0235
2020/0314948 A1* 10/2020 Babaei ............. H04W 52/0216
2020/0351026 A1 11/2020 Babaei et al.

OTHER PUBLICATIONS

CATT: "Discussion on the DRX Timers", 3GPP Draft, R2-1710303, 3GPP TSG-RAN WG2 #99bis, 3rd Generation Partnership Project (3GPP), Mobile Competence Centre, 650, Route Des Lucioles, F-06921, Sophia-Antipolis, Cedex, France, vol. RAN WG2, No. Prague, Czech Republic, Oct. 9, 2017-Oct. 13, 2017, Oct. 8, 2017 (Oct. 8, 2017), XP051342351, pp. 1-4, Retrieved from the Internet: URL:http://www.3gpp.org/ftp/Meetings_3GPP_SYNC/RAN2/Docs/ [retrieved on Oct. 8, 2017], p. 1-p. 3, Figures 1,2.
Huawei et al., "Discussion on DRX with Cross-COT HARQ Feedback", 3GPP Draft, R2-1907744, 3GPP TSG-RAN WG2 Meeting 106, Discussion On DRX with Cross-COT HARQ Feedback, 3rd Generation Partnership Project (3GPP), Mobile Competence Centre, 650, Route Des Lucioles, F-06921, Sophia-Antipolis, Cedex, France, vol. RAN WG2, No. Reno, Nevada, US, Apr. 13, 2019-May 17, 2019, May 3, 2019 (May 3, 2019), XP051712021, 5 Pages, Retrieved from the Internet: URL:http://www.3gpp.org/ftp/tsg%5Fran/WG2%5FRL2/TSGR2%5F106/Docs/R2%2D1907744%2Ezip [retrieved on May 3, 2019], Abstract, p. 1-p. 4, Figures 1,2.
Partial International Search Report—PCT/US2020/038463—ISA/EPO—dated Oct. 12, 2020 (193981WO).
International Search Report and Written Opinion—PCT/US2020/038463—ISAEPO—Dec. 8, 2020 (193981WO).

\* cited by examiner

HYBRID AUTOMATIC REPEAT REQUEST (HARQ) HANDLING FOR DISCONTINUOUS RECEPTION

CROSS-REFERENCE TO RELATED APPLICATION

This Patent Application claims priority to Indian Provisional Patent Application No. 201941030272 by KHOSHNEVISAN et al., filed Jul. 26, 2019, entitled "HYBRID AUTOMATIC REPEAT REQUEST (HARQ) HANDLING FOR DISCONTINUOUS RECEPTION," and assigned to the assignee hereof. The disclosure of the prior Application is considered part of and is incorporated by reference in this Patent Application.

TECHNICAL FIELD

This disclosure relates generally to wireless communications and more specifically to hybrid automatic repeat request (HARQ) handling for discontinuous reception (DRX).

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

The systems, methods, and devices of this disclosure each have several innovative aspects, no single one of which is solely responsible for the desirable attributes disclosed herein.

One innovative aspect of the subject matter described in this disclosure may be implemented in an apparatus for wireless communications. The apparatus may include a first interface and a processing system. The first interface may be configured to obtain a first downlink control information (DCI) message indicating a non-numeric value for a data-to-feedback timing indicator, where the first DCI message schedules a downlink data message and the data-to-feedback timing indicator is associated with feedback timing for the downlink data message. The processing system may be configured to activate a timer based on the first DCI message and on the data-to-feedback timing indicator being the non-numeric value. The first interface may be further configured to obtain monitoring information for a downlink control channel while the timer is active and obtain a second DCI message indicating the feedback timing for the downlink data message based on the monitoring information for the downlink control channel.

Another innovative aspect of the subject matter described in this disclosure may be implemented in a method for wireless communications at an apparatus of a user equipment (UE). The method may include receiving a first DCI message indicating a non-numeric value for a data-to-feedback timing indicator, where the first DCI message schedules a downlink data message and the data-to-feedback timing indicator is associated with feedback timing for the downlink data message, activating a timer based on receiving the first DCI message and on the data-to-feedback timing indicator being the non-numeric value, monitoring a downlink control channel while the timer is active, and receiving a second DCI message indicating the feedback timing for the downlink data message based on monitoring the downlink control channel.

Another innovative aspect of the subject matter described in this disclosure may be implemented in an additional apparatus for wireless communications at a UE. The apparatus may include a processor, memory coupled with the processor, and instructions stored in the memory. The instructions may be executable by the processor to cause the apparatus to receive a first DCI message indicating a non-numeric value for a data-to-feedback timing indicator, where the first DCI message schedules a downlink data message and the data-to-feedback timing indicator is associated with feedback timing for the downlink data message, activate a timer based on receiving the first DCI message and on the data-to-feedback timing indicator being the non-numeric value, monitor a downlink control channel while the timer is active, and receive a second DCI message indicating the feedback timing for the downlink data message based on monitoring the downlink control channel.

Another innovative aspect of the subject matter described in this disclosure may be implemented in an additional apparatus for wireless communications at a UE. The apparatus may include means for receiving a first DCI message indicating a non-numeric value for a data-to-feedback timing indicator, where the first DCI message schedules a downlink data message and the data-to-feedback timing indicator is associated with feedback timing for the downlink data message, activating a timer based on receiving the first DCI message and on the data-to-feedback timing indicator being the non-numeric value, monitoring a downlink control channel while the timer is active, and receiving a second DCI message indicating the feedback timing for the downlink data message based on monitoring the downlink control channel.

Another innovative aspect of the subject matter described in this disclosure may be implemented in a non-transitory computer-readable medium storing code for wireless communications at a UE. The code may include instructions executable by a processor to receive a first DCI message indicating a non-numeric value for a data-to-feedback timing indicator, where the first DCI message schedules a downlink data message and the data-to-feedback timing indicator is associated with feedback timing for the downlink data message, activate a timer based on receiving the first DCI message and on the data-to-feedback timing indicator being the non-numeric value, monitor a downlink control channel while the timer is active, and receive a second DCI message indicating the feedback timing for the downlink data message based on monitoring the downlink control channel.

Some implementations of the method, apparatuses, and non-transitory computer-readable medium described herein may further include operations, features, means, or instructions for deactivating the timer based on receiving the second DCI message indicating the feedback timing for the downlink data message.

In some implementations of the method, apparatuses, and non-transitory computer-readable medium described herein, deactivating the timer may include operations, features, means, or instructions for deactivating the timer in a first symbol after receiving the second DCI message or in a first symbol after a feedback transmission corresponding to the feedback timing indicated by the second DCI message.

Some implementations of the method, apparatuses, and non-transitory computer-readable medium described herein may further include operations, features, means, or instructions for activating the timer includes activating the timer in a first symbol after receiving the first DCI message or in a first symbol after the scheduled downlink data message.

Some implementations of the method, apparatuses, and non-transitory computer-readable medium described herein may further include operations, features, means, or instructions for receiving the downlink data message based on the first DCI message, storing feedback information for the downlink data message based on the first DCI message indicating the non-numeric value, and transmitting a feedback message including the feedback information for the downlink data message according to the feedback timing indicated by the second DCI message.

In some implementations of the method, apparatuses, and non-transitory computer-readable medium described herein, the feedback message may include a hybrid automatic repeat request (HARD) acknowledgment (ACK) message.

Some implementations of the method, apparatuses, and non-transitory computer-readable medium described herein may further include operations, features, means, or instructions for receiving a radio resource control (RRC) message indicating an active duration of the timer.

In some implementations of the method, apparatuses, and non-transitory computer-readable medium described herein, the active duration may be a first active duration of the timer specific to receiving DCI messages indicating non-numeric values, and the RRC message may further indicate a second active duration of the timer.

In some implementations of the method, apparatuses, and non-transitory computer-readable medium described herein, the timer may be a drx-RetransmissionTimerDL or a drx-InactivityTimer.

In some implementations of the method, apparatuses, and non-transitory computer-readable medium described herein, the timer may be specific to a HARQ process for the downlink data message.

In some implementations of the method, apparatuses, and non-transitory computer-readable medium described herein, the timer may be a retransmission timer for downlink and may be associated with a HARQ identifier corresponding to the downlink data message.

Some implementations of the method, apparatuses, and non-transitory computer-readable medium described herein may further include operations, features, means, or instructions for deactivating the timer based on the timer running for an active duration of the timer, entering a low power mode based on deactivating the timer, and refraining from monitoring the downlink control channel while in the low power mode.

In some implementations of the method, apparatuses, and non-transitory computer-readable medium described herein, entering the low power mode may be further based on the UE being outside of an ON duration of a discontinuous reception (DRX) mode and each timer corresponding to monitoring the downlink control channel being deactivated.

Some implementations of the method, apparatuses, and non-transitory computer-readable medium described herein may further include operations, features, means, or instructions for operating according to a DRX mode and monitoring the downlink control channel during an ON duration of the DRX mode, where the first DCI message may be received based on monitoring the downlink control channel during the ON duration.

Some implementations of the method, apparatuses, and non-transitory computer-readable medium described herein may further include operations, features, means, or instructions for transmitting a feedback message for the downlink data message according to the feedback timing indicated by the second DCI message and activating a round-trip time (RTT) timer in a first symbol after transmitting the feedback message. Some implementations of the method, apparatuses, and non-transitory computer-readable medium described herein may further include operations, features, means, or instructions for activating a retransmission timer in a first symbol after expiration of the RTT timer based on the feedback message including a negative acknowledgment (NACK) for the downlink data message and monitoring the downlink control channel while the retransmission timer may be active.

In some implementations of the method, apparatuses, and non-transitory computer-readable medium described herein, the RTT timer may be a drx-HARQ-RTT-TimerDL and the retransmission timer may be a drx-RetransmissionTimerDL.

Another innovative aspect of the subject matter described in this disclosure may be implemented in an apparatus for wireless communications. The apparatus may include a first interface and a processing system. The processing system may be configured to determine a scheduled transmission opportunity for a feedback message including feedback information for one or more downlink data messages and activate a timer in a first symbol after the scheduled transmission opportunity for the feedback message. The first interface may be configured to obtain monitoring information for a downlink control channel while the timer is active and obtain a DCI message requesting transmission of at least a portion of the feedback information for the one or more downlink data messages. The processing system may be further configured to deactivate the timer based on obtaining the DCI message.

Another innovative aspect of the subject matter described in this disclosure may be implemented in a method for wireless communications at an apparatus of a UE. The method may include determining a scheduled transmission opportunity for a feedback message including feedback information for one or more downlink data messages, activating a timer in a first symbol after the scheduled transmission opportunity for the feedback message, monitoring a downlink control channel while the timer is active, receiving a DCI message requesting transmission of at least a portion of the feedback information for the one or more downlink data messages, and deactivating the timer based on receiving the DCI message.

Another innovative aspect of the subject matter described in this disclosure may be implemented in an additional apparatus for wireless communications at a UE. The apparatus may include a processor, memory coupled with the processor, and instructions stored in the memory. The instructions may be executable by the processor to cause the apparatus to determine a scheduled transmission opportunity for a feedback message including feedback information for one or more downlink data messages, activate a timer in a first symbol after the scheduled transmission opportunity for the feedback message, monitor a downlink control channel while the timer is active, receive a DCI message requesting transmission of at least a portion of the feedback information for the one or more downlink data messages, and deactivate the timer based on receiving the DCI message.

Another innovative aspect of the subject matter described in this disclosure may be implemented in an additional apparatus for wireless communications at a UE. The apparatus may include means for determining a scheduled transmission opportunity for a feedback message including feedback information for one or more downlink data messages, activating a timer in a first symbol after the scheduled transmission opportunity for the feedback message, monitoring a downlink control channel while the timer is active, receiving a DCI message requesting transmission of at least a portion of the feedback information for the one or more downlink data messages, and deactivating the timer based on receiving the DCI message.

Another innovative aspect of the subject matter described in this disclosure may be implemented in a non-transitory computer-readable medium storing code for wireless communications at a UE. The code may include instructions executable by a processor to determine a scheduled transmission opportunity for a feedback message including feedback information for one or more downlink data messages, activate a timer in a first symbol after the scheduled transmission opportunity for the feedback message, monitor a downlink control channel while the timer is active, receive a DCI message requesting transmission of at least a portion of the feedback information for the one or more downlink data messages, and deactivate the timer based on receiving the DCI message.

Some implementations of the method, apparatuses, and non-transitory computer-readable medium described herein may further include operations, features, means, or instructions for performing a listen-before-talk (LBT) procedure to gain access to an uplink channel for the scheduled transmission opportunity and refraining from transmitting the feedback message in the scheduled transmission opportunity based on a failure of the LBT procedure.

In some implementations of the method, apparatuses, and non-transitory computer-readable medium described herein, activating the timer may be based on refraining from transmitting the feedback message in the scheduled transmission opportunity.

Some implementations of the method, apparatuses, and non-transitory computer-readable medium described herein may further include operations, features, means, or instructions for transmitting the feedback message in the scheduled transmission opportunity based on determining the scheduled transmission opportunity.

In some implementations of the method, apparatuses, and non-transitory computer-readable medium described herein, deactivating the timer may be further based on receiving any DCI message, any DCI message scheduling a transmission of a downlink data message, the DCI message requesting transmission of at least the portion of the feedback information for the one or more downlink data messages, or a combination thereof.

In some implementations of the method, apparatuses, and non-transitory computer-readable medium described herein, the DCI message may be a second DCI message and the method, apparatuses, and non-transitory computer-readable medium described herein may further include operations, features, means, or instructions for receiving a first DCI message scheduling a transmission of at least one downlink data message of the one or more downlink data messages and including a data-to-feedback timing indicator corresponding to the at least one downlink data message and indicating the scheduled transmission opportunity.

In some implementations of the method, apparatuses, and non-transitory computer-readable medium described herein, a first group indicator for the first DCI message and a second group indicator for the second DCI message may include a same group indicator, a first new ACK-feedback group indicator (NFI) for the first DCI message and a second NFI for the second DCI message may include a same NFI, and the second DCI message may request transmission of at least the portion of the feedback information for the one or more downlink data messages based on the same group indicator and the same NFI.

In some implementations of the method, apparatuses, and non-transitory computer-readable medium described herein, the first DCI message may include a first group indicator and the second DCI message may include a feedback request for the first group indicator and the second DCI message may request transmission of at least the portion of the feedback information for the one or more downlink data messages based on the second DCI message including the feedback request for the first group indicator.

In some implementations of the method, apparatuses, and non-transitory computer-readable medium described herein, the feedback message may be a HARQ-ACK message.

Another innovative aspect of the subject matter described in this disclosure may be implemented in an apparatus for wireless communications. The apparatus may include a first interface and a processing system. The first interface may be configured to output, for transmission to a UE on a downlink control channel, a first DCI message indicating a non-numeric value for a data-to-feedback timing indicator, where the first DCI message schedules a downlink data message and the data-to-feedback timing indicator is associated with feedback timing for the downlink data message. The processing system may be configured to determine an active time for the UE to monitor the downlink control channel based on a timer, where the timer may be activated based on the first DCI message and on the data-to-feedback timing indicator being the non-numeric value. The first interface may be further configured to output, for transmission to the UE on the downlink control channel, a second DCI message indicating the feedback timing for the downlink data message based on the determined active time for the UE to monitor the downlink control channel.

Another innovative aspect of the subject matter described in this disclosure may be implemented in a method for wireless communications at an apparatus of a base station. The method may include transmitting, to a UE on a downlink control channel, a first DCI message indicating a non-numeric value for a data-to-feedback timing indicator, where the first DCI message schedules a downlink data message and the data-to-feedback timing indicator is associated with feedback timing for the downlink data message, determining an active time for the UE to monitor the downlink control channel based on a timer, where the timer is activated based on the first DCI message and on the data-to-feedback timing indicator being the non-numeric value, and transmitting, to the UE on the downlink control channel, a second DCI message indicating the feedback timing for the downlink data message based on the determined active time for the UE to monitor the downlink control channel.

Another innovative aspect of the subject matter described in this disclosure may be implemented in an additional apparatus for wireless communications at a base station. The apparatus may include a processor, memory coupled with the processor, and instructions stored in the memory. The instructions may be executable by the processor to cause the apparatus to transmit, to a UE on a downlink control channel, a first DCI message indicating a non-numeric value for a data-to-feedback timing indicator, where the first DCI message schedules a downlink data message and the data-to-feedback timing indicator is associated with feedback timing for the downlink data message, determine an active time for the UE to monitor the downlink control channel based on a timer, where the timer is activated based on the first DCI message and on the data-to-feedback timing indicator being the non-numeric value, and transmit, to the UE on the downlink control channel, a second DCI message indicating the feedback timing for the downlink data message based on the determined active time for the UE to monitor the downlink control channel.

Another innovative aspect of the subject matter described in this disclosure may be implemented in an additional apparatus for wireless communications at a base station. The apparatus may include means for transmitting, to a UE on a downlink control channel, a first DCI message indicating a non-numeric value for a data-to-feedback timing indicator, where the first DCI message schedules a downlink data message and the data-to-feedback timing indicator is associated with feedback timing for the downlink data message, determining an active time for the UE to monitor the downlink control channel based on a timer, where the timer is activated based on the first DCI message and on the data-to-feedback timing indicator being the non-numeric value, and transmitting, to the UE on the downlink control channel, a second DCI message indicating the feedback timing for the downlink data message based on the determined active time for the UE to monitor the downlink control channel.

Another innovative aspect of the subject matter described in this disclosure may be implemented in a non-transitory computer-readable medium storing code for wireless communications at a base station. The code may include instructions executable by a processor to transmit, to a UE on a downlink control channel, a first DCI message indicating a non-numeric value for a data-to-feedback timing indicator, where the first DCI message schedules a downlink data message and the data-to-feedback timing indicator is associated with feedback timing for the downlink data message, determine an active time for the UE to monitor the downlink control channel based on a timer, where the timer is activated based on the first DCI message and on the data-to-feedback timing indicator being the non-numeric value, and transmit, to the UE on the downlink control channel, a second DCI message indicating the feedback timing for the downlink data message based on the determined active time for the UE to monitor the downlink control channel.

In some implementations of the method, apparatuses, and non-transitory computer-readable medium described herein, the timer may be a retransmission timer for downlink and may be associated with a HARQ identifier corresponding to the downlink data message.

Some implementations of the method, apparatuses, and non-transitory computer-readable medium described herein may further include operations, features, means, or instructions for transmitting an RRC message indicating an active duration of the timer.

In some implementations of the method, apparatuses, and non-transitory computer-readable medium described herein, the active duration may be a first active duration of the timer specific to receiving DCI messages indicating non-numeric values, and the RRC message may further indicate a second active duration of the timer.

In some implementations of the method, apparatuses, and non-transitory computer-readable medium described herein, the timer may be a drx-RetransmissionTimerDL or a drx-InactivityTimer.

Some implementations of the method, apparatuses, and non-transitory computer-readable medium described herein may further include operations, features, means, or instructions for transmitting the downlink data message based on the first DCI message.

Another innovative aspect of the subject matter described in this disclosure may be implemented in an apparatus for wireless communications. The apparatus may include a first interface and a processing system. The first interface may be configured to output, for transmission to a UE on a downlink control channel, a first DCI message scheduling a transmission of a downlink data message and including a data-to-feedback timing indicator corresponding to the downlink data message and indicating a scheduled transmission opportunity. The processing system may be configured to identify a failure to successfully obtain a feedback message including feedback information for the downlink data message in the scheduled transmission opportunity and determine an active time for the UE to monitor the downlink control channel based on a timer, where the timer is activated in a first symbol after the scheduled transmission opportunity. The first interface may be further configured to output, for transmission to the UE on the downlink control channel, a second DCI message requesting transmission of at least a portion of the feedback information for the downlink data message based on the determined active time for the UE to monitor the downlink control channel and identifying the failure to successfully receive the feedback message.

Another innovative aspect of the subject matter described in this disclosure may be implemented in a method for wireless communications at an apparatus of a base station. The method may include transmitting, to a UE on a downlink control channel, a first DCI message scheduling a transmission of a downlink data message and including a data-to-feedback timing indicator corresponding to the downlink data message and indicating a scheduled transmission opportunity, identifying a failure to successfully receive a feedback message including feedback information for the downlink data message in the scheduled transmission opportunity, determining an active time for the UE to monitor the downlink control channel based on a timer, where the timer is activated in a first symbol after the scheduled transmission opportunity, and transmitting, to the UE on the downlink control channel, a second DCI message requesting transmission of at least a portion of the feedback information for the downlink data message based on the determined active time for the UE to monitor the downlink control channel and identifying the failure to successfully receive the feedback message.

Another innovative aspect of the subject matter described in this disclosure may be implemented in an additional apparatus for wireless communications at a base station. The apparatus may include a processor, memory coupled with the processor, and instructions stored in the memory. The instructions may be executable by the processor to cause the apparatus to transmit, to a UE on a downlink control channel, a first DCI message scheduling a transmission of a downlink data message and including a data-to-feedback timing indicator corresponding to the downlink data message and indicating a scheduled transmission opportunity, identify a failure to successfully receive a feedback message including feedback information for the downlink data message in the scheduled transmission opportunity, determine an active time for the UE to monitor the downlink control channel based on a timer, where the timer is activated in a first symbol after the scheduled transmission opportunity, and transmit, to the UE on the downlink control channel, a second DCI message requesting transmission of at least a portion of the feedback information for the downlink data message based on the determined active time for the UE to monitor the downlink control channel and identifying the failure to successfully receive the feedback message.

Another innovative aspect of the subject matter described in this disclosure may be implemented in an additional apparatus for wireless communications at a base station. The apparatus may include means for transmitting, to a UE on a downlink control channel, a first DCI message scheduling a transmission of a downlink data message and including a data-to-feedback timing indicator corresponding to the downlink data message and indicating a scheduled transmission opportunity, identifying a failure to successfully receive a feedback message including feedback information for the downlink data message in the scheduled transmission opportunity, determining an active time for the UE to monitor the downlink control channel based on a timer, where the timer is activated in a first symbol after the scheduled transmission opportunity, and transmitting, to the UE on the downlink control channel, a second DCI message requesting transmission of at least a portion of the feedback information for the downlink data message based on the determined active time for the UE to monitor the downlink control channel and identifying the failure to successfully receive the feedback message.

Another innovative aspect of the subject matter described in this disclosure may be implemented in a non-transitory computer-readable medium storing code for wireless communications at a base station. The code may include instructions executable by a processor to transmit, to a UE on a downlink control channel, a first DCI message scheduling a transmission of a downlink data message and including a data-to-feedback timing indicator corresponding to the downlink data message and indicating a scheduled transmission opportunity, identify a failure to successfully receive a feedback message including feedback information for the downlink data message in the scheduled transmission opportunity, determine an active time for the UE to monitor the downlink control channel based on a timer, where the timer is activated in a first symbol after the scheduled transmission opportunity, and transmit, to the UE on the downlink control channel, a second DCI message requesting transmission of at least a portion of the feedback information for the downlink data message based on the determined active time for the UE to monitor the downlink control channel and identifying the failure to successfully receive the feedback message.

Some implementations of the method, apparatuses, and non-transitory computer-readable medium described herein may further include operations, features, means, or instructions for transmitting an RRC message indicating an active duration of the timer.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
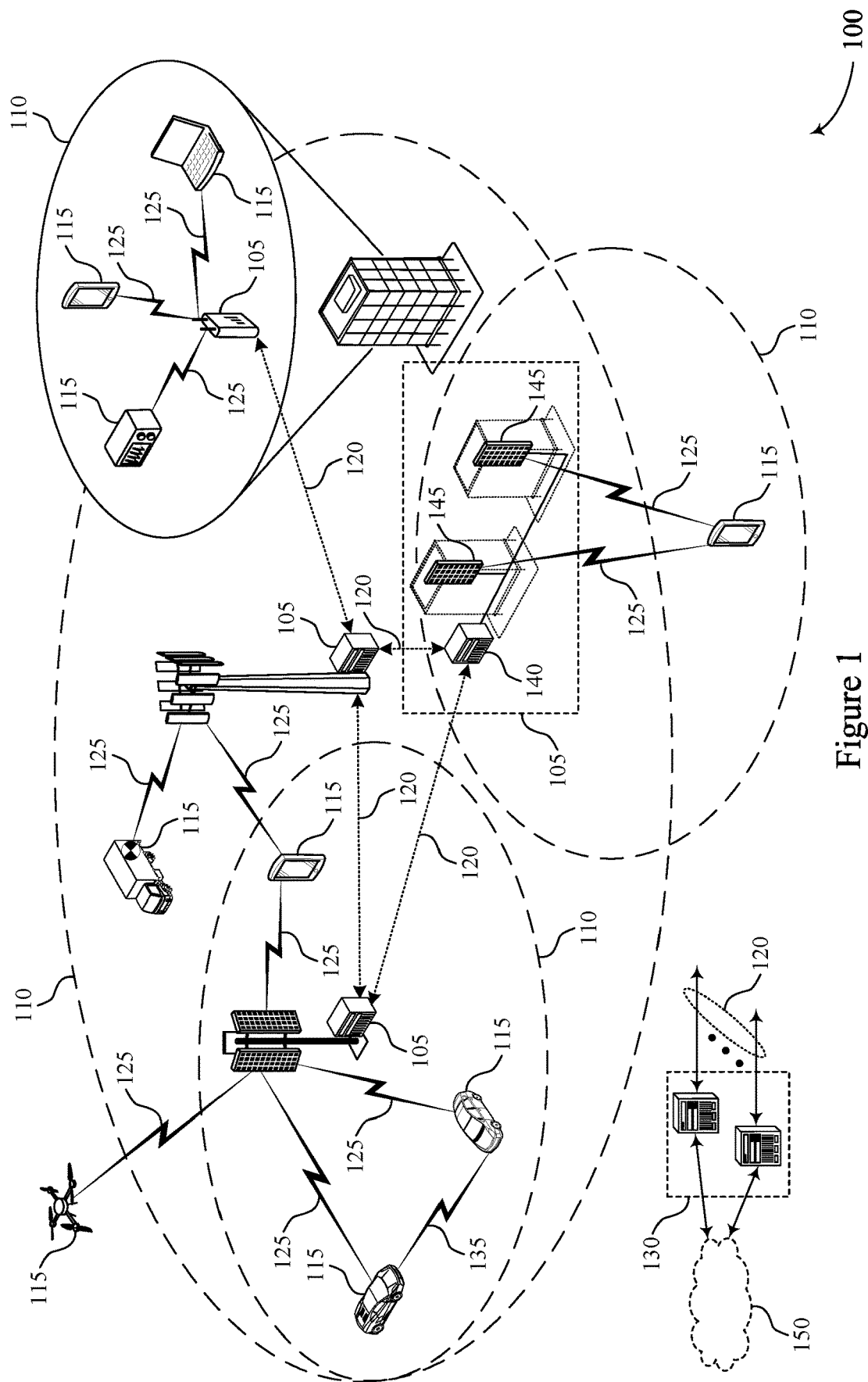
FIGS. 1 and 2 show examples of wireless communications systems that support hybrid automatic repeat request (HARQ) handling for discontinuous reception (DRX).

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system, or network that is capable of transmitting and receiving radio frequency (RF) signals according to any of the IEEE 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular, or internet of things (IoT) network, such as a system utilizing 3G, 4G, or 5G, or further implementations thereof, technology.

In some systems, a user equipment (UE) may support hybrid automatic repeat request (HARD) processes while operating in a discontinuous reception (DRX) mode. In the DRX mode, the UE may switch between an active state (for example, during which the UE monitors a downlink control channel for downlink control information (DCI) messages)

and an inactive state. The UE may continue operating in the active state based on one or more timers. For example, a set of timers may maintain the active state for the UE while at least one timer of the set of timers is running. Each timer may correspond to a specific activation trigger, a specific deactivation trigger, and a specific active duration. Examples of timers that maintain the active state at the UE may include an ON duration timer, an inactivity timer, and a retransmission timer. In some implementations, the UE may support other timers that may not maintain the active state, but may trigger activation of other timers or operations, such as a round-trip time (RTT) timer. If no timer maintaining the active state is currently running at the UE, the UE may operate in a sleep mode (for example, during which the UE may refrain from monitoring the downlink control channel).

In some implementations, a UE may use a timer to maintain the active state based on receiving a DCI message for a data message with a data-to-feedback timing indicator indicating a non-numeric value for the data message. In some examples, the data-to-feedback timing indicator may be a K1 value, where the K1 value indicates a slot in which the UE may transmit feedback information for the data message. For example, the K1 value may specify the number of slots after reception of the data message that the corresponding feedback message is to be transmitted. The non-numeric value for the feedback timing may trigger the UE to store feedback information for the data message and transmit the feedback information based on a subsequent DCI message specifying the actual feedback timing for the data message. In such implementations, activating the timer based on receiving the DCI with the a non-numeric K1 value may allow the UE to extend an active state and continue monitoring the downlink control channel for a DCI message with a numeric K1 value for the feedback timing. The UE may deactivate the timer based on receiving the DCI message indicating the actual feedback timing. In some examples, the timer may be specific to handling non-numeric values for data-to-feedback timing indicators. In some other examples, the timer may support multiple operations. For example, the timer may be an inactivity timer, a retransmission timer, or some similar timer that the UE reuses to handle non-numeric values for data-to-feedback timing indicators, among other operations. For example, such a timer may be triggered both based on receiving a DCI with a non-numeric K1 value and based on one or more other potential triggers (for example, receiving a DCI indicating a new transmission, transmitting a negative acknowledgment (NACK) for HARQ feedback, etc.).

In some other implementations, a UE may use a timer to maintain the active state following a feedback opportunity to support dynamic group-based HARQ messaging. In dynamic group-based HARQ messaging, a base station may re-request feedback information from a previously scheduled feedback transmission using a DCI message. For example, if the base station fails to receive the scheduled feedback transmission for a group of data messages (for example, based on a failed listen-before-talk (LBT) process at the UE or misdetection at the base station), the base station may transmit a DCI message re-requesting feedback information for the group of data messages. In such implementations, activating the timer in a first symbol after the scheduled feedback opportunity may allow the UE to extend an active state and continue monitoring the downlink control channel for a DCI message requesting at least a portion of the feedback information scheduled to be transmitted in the feedback opportunity. The UE may deactivate the timer based on receiving one or more of a DCI message, a DCI message for a downlink transmission, or a DCI message requesting feedback information for the group of data messages following the scheduled feedback opportunity.

Particular implementations of the subject matter described in this disclosure can be implemented to realize one or more of the following potential advantages. In some implementations, utilizing a timer to extend an active state for a UE in particular scenarios (for example, when handling a non-numeric data-to-feedback timing indicator, when supporting dynamic group-based HARQ messaging, or both) may significantly reduce the latency associated with HARQ feedback. For example, if the UE returns to an inactive state prior to receiving a DCI message indicating feedback timing for a data message or group of data messages, the UE may not transmit the feedback information until a next DRX cycle. This may introduce significant latency into the HARQ feedback process, especially for relatively long DRX cycles. By activating a timer to maintain an active state and continue monitoring the downlink control channel, the UE may receive a DCI message scheduling a feedback opportunity in the current DRX cycle, potentially supporting a faster turnaround of feedback information. Moreover, if a NACK is transmitted, this faster turnaround of feedback information may further support lower latency retransmissions of data from a base station, thereby potentially improving the latency of other data-based processes at the UE.

FIG. 1 illustrates an example of a wireless communications system 100 that supports hybrid automatic repeat request handling for discontinuous reception in accordance with aspects of the present disclosure. The wireless communications system 100 may include base stations 105, UEs 115, and a core network 130. In some examples, the wireless communications system 100 may be an LTE network, an LTE-Advanced (LTE-A) network, an LTE-A Pro network, or a New Radio (NR) network. In some implementations, the wireless communications system 100 may support enhanced broadband communications, ultra-reliable (for example, mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and UEs 115 may wirelessly communicate via one or more communication links 125. Each base station 105 may provide a coverage area 110 over which UEs 115 and the base station 105 may establish communication links 125. The coverage area 110 may be an example of a geographic area over which a base station 105 and a UE 115 support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, base stations 105, or network equipment (for example, core network nodes, relay devices, integrated access and backhaul (IAB) nodes, or other network equipment), as shown in FIG. 1.

The base stations 105 may communicate with the core network 130, or with one another, or both. For example, base stations 105 may interface with the core network 130 through backhaul links 120 (for example, via an S1, N2, N3, or another interface). The base stations 105 may communicate with one another over backhaul links 120 (for example, via an X2, Xn, or other interface) either directly (for example, directly between base stations 105), or indirectly (for example, via core network 130), or both. In some examples, backhaul links 120 may be or include one or more wireless links.

One or more of base stations 105 described herein may include or may be referred to by a person of ordinary skill in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" also may be referred to as a unit, a station, a terminal, or a client, among other examples. A UE 115 also may include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an IoT device, an Internet of Everything (IoE) device, a machine type communications (MTC) device, or the like, which may be implemented in various objects such as appliances, vehicles, meters, or the like.

The UEs 115 described herein may be able to communicate with various types of devices, such as other UEs 115 that may sometimes act as relays as well as base stations 105 and network equipment including macro eNBs or gNBs, small cell eNBs or gNBs, relay base stations, and the like, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting communication links 125. For example, a carrier used for a communication link 125 may include a portion of a radio frequency spectrum band (for example, a bandwidth part (BWP)) that is operated according to physical layer channels for a given radio access technology (for example, LTE, LTE-A, LTE-A Pro, NR). Each physical layer channel may carry acquisition signaling (such as synchronization signals, system information, etc.), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (such as a duration of one modulation symbol) and one subcarrier, where the symbol period and subcarrier spacing are inversely related. The number of bits carried by each resource element may depend on the modulation scheme (for example, the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (such as spatial layers or beams), and the use of multiple spatial layers may further increase the data rate or data integrity for communications with a UE 115.

Time intervals for base stations 105 or UEs 115 may be expressed in multiples of a basic time unit which may, for example, refer to a sampling period of $T_S=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (such as 10 milliseconds (ms)). Each radio frame may be identified by a system frame number (SFN) (for example, ranging from 0 to 1023).

Each frame may include multiple consecutively numbered subframes or slots, and each subframe or slot may have the same duration. In some implementations, a frame may be divided (for example, in the time domain) into subframes, and each subframe may be further divided into a number of slots. Alternatively, each frame may include a variable number of slots, and the number of slots may depend on subcarrier spacing. Each slot may include a number of symbol periods (for example, depending on the length of the cyclic prefix prepended to each symbol period). In some wireless communications systems 100, a slot may further be divided into multiple mini-slots containing one or more symbols. Excluding the cyclic prefix, each symbol period may contain one or more (for example, $N_f$) sampling periods. The duration of a symbol period may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some implementations, the TTI duration (for example, the number of symbol periods in a TTI) may be variable. Additionally, or alternatively, the smallest scheduling unit of the wireless communications system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. A control region (for example, a control resource set (CORESET)) for a physical control channel may be defined by a number of symbol periods and may extend across the system bandwidth or a subset of the system bandwidth of the carrier. One or more control regions (CORESETs) may be configured for a set of UEs 115. For example, UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In some other examples, overlapping geographic coverage areas 110 associated with different technologies may be supported by different base stations 105. The wireless communications system 100 may include, for example, a heterogeneous network in which different types of base stations 105 provide coverage for various geographic coverage areas 110 using the same or different radio access technologies.

Some UEs 115 may be configured to employ operating modes that reduce power consumption, such as half-duplex communications (for example, a mode that supports one-way communication via transmission or reception, but not transmission and reception simultaneously). In some examples, half-duplex communications may be performed at a reduced peak rate. Other power conservation techniques for UEs 115 include entering a power saving deep sleep mode when not engaging in active communications, operating over a limited bandwidth (for example, according to narrowband communications), or a combination of these techniques. For example, some UEs 115 may be configured for operation using a narrowband protocol type that is associated with a predefined portion or range (such as a set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. UEs 115 may be designed to support ultra-reliable, low-latency, or critical functions (such as mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some implementations, a UE 115 also may be able to communicate directly with other UEs 115 over a device-to-device (D2D) communication link 135 (for example, using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some implementations, groups of UEs 115 communicating via D2D communications may utilize a one-to-many (1:M) system in which each UE 115 transmits to every other UE 115 in the group. In some examples, a base station 105 facilitates the scheduling of resources for D2D communications. In some other implementations, D2D communications are carried out between UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), a user plane function (UPF)). The control plane entity may manage non-access stratum (NAS) functions such as mobility, authentication, and bearer management for UEs 115 served by base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with UEs 115 through a number of other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (for example, radio heads and ANCs) or consolidated into a single network device, such as a base station 105.

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features, but the waves may penetrate structures sufficiently for a macro cell to provide service to UEs 115 located indoors. Transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some implementations, operations in unlicensed bands may be based on a carrier aggregation configuration in conjunction with component carriers operating in a licensed band. Operations in unlicensed spectrum may include downlink transmissions, uplink transmissions, P2P transmissions, D2D transmissions, or the like.

A base station 105 or UE 115 may be equipped with multiple antennas, which may be used to employ techniques such as transmit diversity, receive diversity, multiple-input multiple-output (MIMO) communications, or beamforming. The antennas of a base station 105 or UE 115 may be located within one or more antenna arrays or antenna panels, which may support MIMO operations or transmit or receive beamforming. For example, one or more base station antennas or antenna arrays may be co-located at an antenna assembly, such as an antenna tower. In some implementations, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which also may be referred to as spatial filtering, directional transmission, or directional reception, is a signal processing technique that may be used at a transmitting device or a receiving device (for example, a base station 105 or a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

The UEs 115 and base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (such as, low signal-to-noise ratio (SNR) conditions). In some implementations, a device may support same-slot HARQ feedback, where the device may provide HARQ feedback in a specific slot for data received in a previous symbol in the slot. In some other implementations, the device may provide HARQ feedback in a subsequent slot, or according to some other time interval.

In some wireless communications systems 100, a UE 115 may operate in a DRX mode. In the DRX mode, the UE 115 may switch between an active state (for example, during which the UE 115 monitors a downlink control channel for DCI messages) and an inactive or sleep state. The UE 115 may continue operating in the active state based on one or more timers. For example, a set of timers may maintain the active state for the UE 115 while at least one timer of the set of timers is running. Each timer may correspond to a specific activation trigger, a specific deactivation trigger, and a specific active duration. Examples of timers that maintain the active state at the UE 115 may include an ON duration timer, an inactivity timer, and a retransmission timer. In some implementations, the UE 115 may support other timers that may not maintain the active state, but may trigger activation of other timers or operations, such as an RTT timer. If no timer maintaining the active state is currently running at the UE 115, the UE 115 may operate in a sleep mode (for example, during which the UE 115 may refrain from monitoring the downlink control channel).

A UE 115 may use a timer to support particular HARQ operations while operating in the DRX mode. In some implementations, the UE 115 may use a timer to maintain an active state based on receiving a DCI message with a data-to-feedback timing indicator (for example, a K1 value) indicating a non-numeric value for a data message. For example, the UE 115 may receive, from a base station 105, a DCI message with feedback timing for the data message based on maintaining the active state. In some other implementations, the UE 115 may use a timer to maintain an active duration following a feedback opportunity to support dynamic group-based HARQ messaging. For example, the UE 115 may receive, from a base station 105, a DCI message requesting a retransmission of feedback information previously scheduled for the feedback opportunity based on maintaining the active duration.

Figure 2:
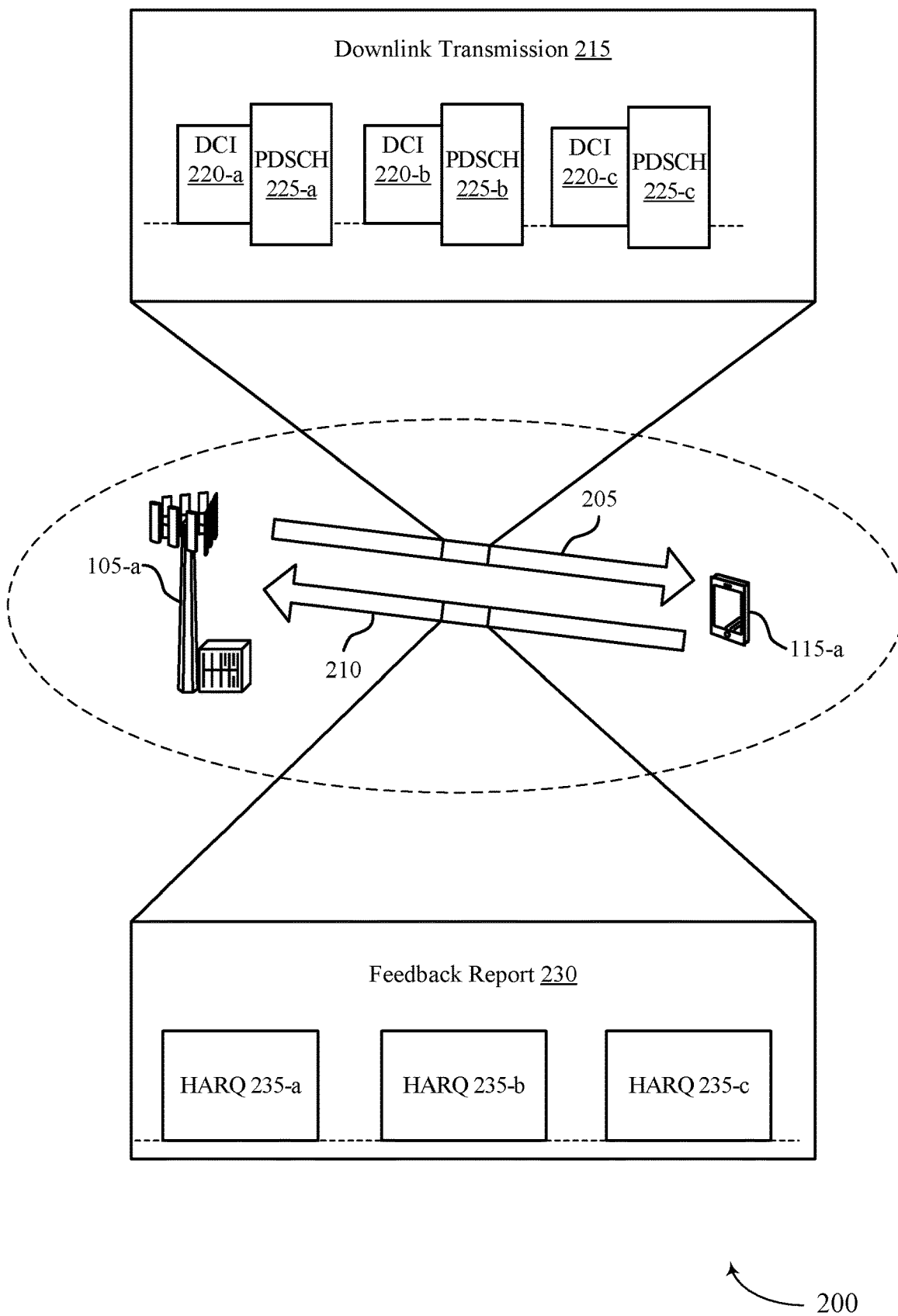

FIG. 2 shows an example of a wireless communications system 200 that supports HARQ handling for DRX. In some examples, the wireless communications system 200 may implement aspects of a wireless communications system 100. The wireless communications system 200 may include a base station 105-a and a UE 115-a, which may be examples of a corresponding base station 105 and a corresponding UE 115 as described with reference to FIG. 1.

The base station 105-a and the UE 115-a may employ DRX techniques, in which the UE 115-a may operate in a DRX mode. In the DRX mode, the UE 115-a has periods of time where reception of messages, transmission of messages, or both may not be available for the UE 115-a. For example, the DRX mode may allow the UE 115-a to operate in two modes, an active mode and an inactive mode. In the active mode, the UE 115-a may transmit data to the base station 105-a over a carrier 210 and may receive data from the base station 105-a over a carrier 205. In the active mode, the UE 115-a may additionally, or alternatively monitor for downlink messages from the base station 105-a. In the inactive mode, however, the UE 115-a may not transmit data to the base station 105-a over the carrier 210, may not receive data from the base station 105-a over the carrier 205, or both. In the inactive mode, the UE 115-a may operate in a low power state, such as a sleep state, where data transmission and reception are disabled to allow the UE 115-a to conserve power. In some implementations, the low power state may support a reduced set of operations at the UE 115-a (for example, receiving signals or beacons using a low power receiver).

The differing modes, whether active or inactive, may occur periodically. For example, the UE 115-a may operate in the active mode for a time period. The UE 115-a may operate in the inactive mode for another time period. The UE 115-a may cycle between active mode and inactive mode according to a DRX schedule or periodicity. In some implementations, the total amount of time that it takes for the UE 115-*a* to cycle between a first active mode to a second active mode (such as from the start of a first active mode, through a first inactive mode, and to the start of a second active mode) may be known as a DRX cycle. The UE 115-*a* may continuously perform DRX cycles while in DRX mode. Operational capabilities of the medium access control (MAC) layer protocol data unit (PDU) for the UE 115-*a* may allow the UE 115-*a* to operate in DRX mode. The UE 115-*a* operating in DRX mode may allow the UE 115-*a* to conserve power. For example, during inactive mode, the UE 115-*a* may utilize less processing overhead, and therefore use less power than during an active mode. However, during the active mode, the UE 115-*a* may use more power than during the inactive mode to accommodate a higher processing overhead. The UE 115-*a* utilizing DRX mode may cycle between active and inactive modes or states (for example, between an "awake" state and a "sleep" state), and therefore the UE 115-*a* may consume less power than a UE 115 operating continuously in an active mode.

While the UE 115-*a* operates in DRX mode, the base station 105-*a* may transmit one or more downlink transmissions 215 to the UE 115-*a* over a carrier 205. For example, the base station 105-*a* may determine when the UE 115-*a* is expected to be in an active state and may schedule downlink transmissions 215 based on the determination. While, in some examples, the base station 105-*a* may inaccurately estimate when the UE 115-*a* is in the active state (for example, if the UE 115-*a* misses a trigger for a timer keeping the UE 115-*a* in the active state), this determination by the base station 105-*a* may improve the reliability of downlink transmissions 215 (for example, based on the lower likelihood of the base station 105-*a* transmitting downlink transmissions 215 when the UE 115-*a* is inactive and may not be able to receive the downlink transmissions 215). The downlink transmissions 215 may include downlink control transmissions (such as physical downlink control channel (PDCCH) transmissions) and downlink data transmissions (such as physical downlink shared channel (PDSCH) transmissions). The downlink control channel transmissions may include downlink control information (DCI) in a DCI message. For example, the PDCCH transmission may include a DCI 220-*a*, and the PDSCH transmission may include a PDSCH 225-*a*. The base station 105-*a* may transmit the DCIs 220 and PDSCHs 225 when the UE 115 is in an ON duration. Accordingly, the base station 105-*a* may have periodic transmission opportunities for the downlink transmissions 215, but the actual downlink transmissions 215 sent by the base station 105-*a* may not be periodic.

In some examples, downlink transmissions 215 may include information for scheduling one or more feedback reports 230. For example, a downlink transmission 215 may include a DCI 220-*a*. In some implementations, the DCI 220-*a* may schedule a downlink transmission 215 (for example, a PDSCH 225-*a*) and may include an indication for when the UE 115-*a* may send a feedback report 230 for the downlink data transmission to the base station 105-*a* over the carrier 210. The feedback report 230 may include information indicating whether the UE 115-*a* successfully received the information supplied in a PDSCH 225 transmission to the UE 115-*a*. For example, a feedback message, such as a HARQ-ACK message 235, may include positive acknowledgment (ACK) information, negative acknowledgment (NACK) information, or both indicating either successful reception and decoding (with an ACK) or unsuccessful reception and decoding (with a NACK) of a PDSCH 225. The feedback reports 230 may be transmitted in an uplink control channel transmission (such as a physical uplink control channel (PUCCH) transmission) or an uplink data channel transmission (such as a physical uplink shared channel (PUSCH) transmission) by the UE 115-*a* to the base station 105-*a*.

The UE 115-*a* operating in DRX mode may utilize timers to schedule active and inactive time periods. For example, the UE 115-*a* may include a timer that may count down from a starting time until an expiration of the timer. The UE 115-*a* may receive a timer configuration, which may include the timer's duration, from the base station 105-*a*. The UE 115-*a* may receive the timer configuration in a radio resource control (RRC) message from the base station 105-*a*. The UE 115-*a* may utilize a variety of different timers while operating in DRX mode.

In a first example, the UE 115-*a* may include an ON duration timer such as a drx-onDurationTimer. The ON duration timer may determine the default amount of time that the UE 115-*a* may be in active mode (for example, during an ON duration of a DRX cycle). During the active mode, the UE 115-*a* may monitor for downlink control messages that may schedule the UE 115-*a* for transmission or reception of data. In another example, the UE 115-*a* may use an inactivity timer such as a drx-InactivityTimer. The inactivity timer may determine the amount of time that the UE 115-*a* remains in an active mode after reception of a DCI 220. In some implementations, the inactivity timer may extend the ON duration time of the UE 115-*a*. For example, the base station 105-*a* may send a PDCCH transmission (such as a DCI 220) to the UE 115-*a*. The inactivity timer may extend the amount of time that the UE 115-*a* remains in the active mode after receiving the PDCCH transmission. The UE 115-*a* may manage a single ON duration timer and a single inactivity timer (for example, these timers may not be HARQ process-specific).

In another example, the UE 115-*a* may use an RTT timer such as a drx-HARQ-RTT-TimerDL. The RTT timer may be used to determine the minimum duration before a downlink assignment for a feedback re-transmission may be received from a base station 105-*a*. For example, the UE 115-*a* may send a feedback report 230 to the base station 105-*a*, which may contain HARQ feedback (for example, a HARQ-ACK message 235). The minimum amount of time in which the UE 115-*a* may receive a retransmission or retransmission request from the base station 105-*a* in response to the HARQ-ACK message 235 may be determined by the RTT timer. The length of the RTT timer may be based on a roundtrip delay for over-the-air (OTA) communications, a processing capability of the base station 105-*a*, or both. In yet another example, the UE 115-*a* may use a retransmission timer such as a drx-RetransmissionTimerDL. The retransmission timer may be used to determine the maximum amount of time the UE 115 may remain in an active mode monitoring for a downlink retransmission from the base station 105-*a*. For example, the UE 115-*a* may send a feedback report 230 (such as a HARQ-ACK message 235-*a*) to the base station 105-*a*. The feedback report 230 may include a HARQ NACK. The base station 105-*a* may send a subsequent retransmission in response to the HARQ NACK. In this example, the amount of time that the UE 115-*a* may monitor for the retransmission from the base station 105-*a* may be determined by the retransmission timer. In some implementations, the RTT timer and the retransmission timer may be used to determine the total HARQ process timing that the UE 115-*a* may operate. For example, the RTT timer may be used to determine the minimum amount of time before a re-transmission may be received by the UE 115-*a* and to trigger activation of the retransmission timer, and the retransmission timer may determine the amount of time that the UE 115-*a* may monitor for the retransmission from the base station 105-*a* (such as in a subsequent downlink transmission). The UE 115-*a* may manage HARQ process-specific RTT and retransmission timers.

In some implementations, for the UE 115-*a* operating in DRX mode, the total active time (such as the time where the UE 115-*a* is not in an inactive mode) may be based on a combination of the timers described herein. The total active time may be based on at least one timer configured to maintain the UE 115-*a*'s ON duration continuing to run. For example, the ON duration timer, the inactivity timer, and the retransmission timer may keep the UE 115-*a* in an active state if at least one of these timers is active. Once all of these timers are inactive (for example, the running timers all expire), the UE 115-*a* may return to an inactive state. However, in some examples, one or more timers may not be used in determining the total active time. For example, the RTT timer may not maintain the ON duration for the UE 115-*a*, but instead may indicate when to start the retransmission timer following a feedback transmission by the UE 115-*a*.

In some examples, a DCI 220 may indicate a new transmission, either uplink or downlink, by either the UE 115-*a* or the base station 105-*a*. The indication of a new transmission may be received by the UE 115-*a* in an active mode in a downlink transmission 215 from the base station 105-*a*. For example, the DCI 220-*a* may include a message indicating that a subsequent new downlink message is scheduled for transmission to the UE 115-*a*. In another example, the DCI 220-*a* may indicate an uplink grant for a subsequent new uplink message to be transmitted by the UE 115-*a*. In these examples, the UE 115-*a* may continue operating in the active mode to receive or transmit the subsequent transmission from or to the base station 105-*a*. The inactivity timer may be triggered (started) after the last symbol of the received PDCCH transmission (such as the DCI 220-*a*) from the base station 105-*a*. In such examples, the UE 115-*a* may remain in an active mode until the expiration of the inactivity timer. Thus, the total time that the UE 115-*a* may remain in an active mode may be based upon the ON duration timer and the inactivity timer.

In some examples, the UE 115-*a* may receive an indication from the base station 105-*a* indicating a scheduled downlink transmission from the base station 105-*a*. The UE 115-*a* may receive the indication in a downlink transmission 215 from the base station 105-*a*. The indication may be received in the DCI 220-*a* transmitted by the base station 105-*a*. For example, the base station 105-*a* may send a DCI 220-*a* which may include an indication of a subsequent PDSCH 225-*a* transmission by the base station 105-*a* to the UE 115-*a*. The UE 115-*a* may attempt to receive and decode the PDSCH 225-*a* and may transmit a corresponding HARQ-ACK message 235-*a* to the base station 105-*a* with feedback information for the PDSCH 225-*a* reception. In such examples, the UE 115-*a* may start an RTT timer to offset a retransmission timer from the HARQ-ACK message 235-*a* transmission. This may allow the UE 115-*a* to account for the OTA propagation time for the HARQ transmission to reach the base station 105-*a* and for the subsequent retransmission to reach the UE 115-*a*. In some examples, the RTT timer may start after the final symbol of the HARQ-ACK message 235-*a* transmission to the base station 105-*a*.

In some implementations, the RTT timer may expire. This may occur naturally once the RTT timer duration has been reached. When the RTT timer expires, the retransmission timer may be started. The retransmission timer may hold the UE 115-*a* in an active mode, which may extend the time for UE 115-*a* to receive a retransmission by the base station 105-*a*. The retransmission timer may begin in the first symbol after the RTT timer has expired. The UE 115-*a* may remain in an active mode while the retransmission timer is running and monitor for a retransmission by the base station 105-*a*. For example, the UE 115-*a* may send a HARQ NACK in a HARQ-ACK message 235-*a* to the base station 105-*a*.

The base station 105-*a* may receive the HARQ NACK or may not receive the HARQ-ACK message 235-*a*, triggering a retransmission of the corresponding PDSCH 225-*a*. For example, the base station 105-*a* may transmit a DCI 220-*b* indicating a retransmission of the PDSCH 225-*a* (for example, in a PDSCH 225-*b*) while the retransmission timer is running. The UE 115-*a* may receive this retransmission based on the retransmission timer keeping the UE 115-*a* active. In implementations where no further DCI 220 is received by the UE 115-*a* from the base station 105-*a* during the duration of the retransmission timer, the retransmission timer may naturally expire. In such implementations, the UE 115-*a* may enter an inactive state once the retransmission timer has expired (for example, if the other inactivity parameters are also met).

In some examples, the UE 115-*a* may determine the timing for sending a subsequent feedback report 230 in response to a downlink transmission 215 based on a value supplied in a DCI 220. For example, a DCI 220-*a* may include an indicator defining the timing for the UE 115-*a* to transmit the corresponding HARQ-ACK message 235-*a* to the base station 105-*a* (where the HARQ-ACK message 235-*a* may indicate the reception of the PDSCH 225-*a* scheduled by the DCI 220-*a*). The indicator may be a data-to-feedback timing indicator, which may additionally, or alternatively be referred to as a K1 value, a PDSCH-to-HARQ-timing-indicator, or both. In some examples, the K1 value may be a numeric value, and may indicate an exact number of slots (or TTIs) before the feedback report 230 is sent to the base station 105-*a*. For example, a K1 value of 3 may be indicated to the UE 115-*a* in the DCI 220-*a*. In this example, the K1 value indicates that in three slots after reception of the PDSCH 225-*a*, the UE 115-*a* may transmit the corresponding HARQ-ACK message 235-*a* to the base station 105-*a*.

However, in some examples, the K1 value may be non-numeric. A non-numeric K1 value may be used to postpone the transmission of feedback reports 230. For example, the RRC parameter K1 may support sending an indicator to the UE 115-*a* to store feedback reports 230, rather than providing timing for transmitting the feedback reports 230. In this example, the base station 105-*a* may send a subsequent transmission where the DCI may indicate when a stored feedback report 230 is to be transmitted to the base station 105-*a*. The now-triggered feedback report may include the stored feedback report from a previous transmission. For example, the base station 105-*a* may send a DCI 220-*a* and a PDSCH 225-*a* to the UE 115-*a*. The DCI 220-*a* may contain a non-numeric K1 value. The non-numeric K1 value may trigger the UE 115-*a* to store a feedback report associated with reception of the PDSCH 225-*a*. The base station 105-*a* may subsequently send a second DCI 220-*b* with a numeric K1 value and indicating the feedback process for the PDSCH 225-*a*. The numeric K1 value may trigger the UE 115-*a* to send a HARQ-ACK message 235-*a* to the base station 105-*a*, which may include the stored feedback report associated with reception of the PDSCH 225-*a*.

In some implementations, the UE 115-*a* may receive a DCI 220 with a non-numeric K1 value while operating in DRX mode. To support the UE 115-*a* remaining in the active mode long enough to receive the second DCI 220 containing the feedback timing information for the postponed feedback, the UE 115-*a* may implement a timer upon identifying a non-numeric K1 value in a DCI 200. The timer may be used to hold the UE 115-*a* in an active mode, which may prevent the UE 115-*a* from entering an inactive mode. This timer may allow for the UE 115-*a* to receive the numeric K1 value in a subsequent downlink transmission, such that the UE 115-*a* may transmit the feedback prior to going to sleep.

In some examples, the wireless communications system 200 may support NR communications, which may allow for a static transmission mode (such as type 1) and a dynamic transmission mode (such as type 2). In some implementations, the type 2 mode may allow for grouping of multiple transmissions by the UE 115-*a*. In such implementations, multiple feedback codebooks (such as dynamic HARQ codebooks) may be supported, where ACK/NACK information for multiple PDSCHs 225 may be grouped together in the same codebook. A UE 115-*a* may transmit a single feedback report 230 for HARQ feedback for multiple downlink transmissions. For example, a type-2 codebook may allow for the grouping of information for multiple feedback reports 230 into a single HARQ-ACK message 235 transmission. For example, the base station 105-*a* may transmit a first downlink transmission to the UE 115-*a* indicating a first downlink group. The base station 105-*a* may additionally transmit a second downlink transmission to the UE 115-*a* indicating the same downlink group. Based on the downlink transmissions corresponding to the same downlink group, the base station 105-*a* may indicate that the feedback reports associated with the two downlink transmissions may be grouped into a single uplink transmission. The UE 115-*a* may transmit the grouped feedback report 230 to the base station 105-*a*.

For example, the base station 105-*a* may send a first downlink transmission 215, which may include a DCI 220-*a* and a PDSCH 225-*a*. The DCI 220-*a* may include information scheduling a HARQ report (such as a HARQ-ACK message 235-*a*) to be sent back to the base station 105-*a* in response to the PDSCH 225-*a*. The information in the HARQ-ACK message 235-*a* may be based upon a HARQ codebook, which may indicate if the information in the PDSCH 225-*a* transmission was successfully received and decoded (using an ACK) or was not successfully received and decoded (using a NACK). The DCI 220-*a* may include indicator values which may be used to schedule the subsequent HARQ-ACK message 235-*a* by the UE 115-*a*. The indicator values may include a K1 value, which may indicate the slot in which the HARQ-ACK message 235-*a* is to be sent to the base station 105-*a*. As discussed previously, the K1 value may be numeric or non-numeric. The DCI 220-*a* also may include group-scheduling indications, including a group (G) value, a request (R) value, a downlink assignment index (DAI) value, a new ACK-feedback group indicator (NFI) value, or some combination of these parameters. The G value may indicate the group that the HARQ reports are grouped into. In some implementations, two groups may be supported, however, in some other implementations, more than two groups may be supported. The R value may indicate a request for feedback information for a different group. The DAI value may indicate the number of HARQ reports to be transmitted in the same group. In some implementations, the DAI value may be a counter DAI (cDAI) value and may incrementally count the number of grouped HARQ reports in the same transmission. Additionally, or alternatively, the DAI value may be a total DAI (tDAI) value, which may indicate the total number of HARQ reports grouped in the same transmission. In some implementations the tDAI value may be included for scheduled downlink groups, while the cDAI value may be included for dynamic grouping, where the number of HARQ-ACK bits for a PDSCH group may change between successive request for HARQ-ACK feedback. The NFI value may be a toggle bit and may indicate if a same G value corresponds to a new feedback opportunity. For example, if the base station 105-*a* successfully receives HARQ feedback for group G=0, the base station 105-*a* may toggle the NFI bit for the next DCI 220 indicating group G=0, such that the UE 115-*a* may determine that the previous feedback for group G=0 is successfully received by the base station 105-*a*. The UE 115-*a* may remove the stored feedback information for this group and restart aggregating feedback information for the group with the new DCI 220.

The K1 value and the group-based indicators may be used to coordinate transmission of multiple HARQ reports in the same feedback report 230. For example, the base station 105-*a* may send a first downlink transmission 215 including a DCI 220-*a* and a PDSCH 220-*a*. The DCI 220-*a* may include a K1 value of 3, a DAI value of 1, a G value of 0, an R value of 0, and an NFI value of 0. The base station 105-*a* also may send a second downlink transmission 215. The second downlink transmission 215 may include a DCI 220-*b* and a PDSCH 225-*b*. The DCI 220-*b* may include a K1 value of 2, a DAI value of 2, a G value of 0, an R value of 0, and an NFI value of 0. The two K1 values may indicate that the corresponding HARQ reports may be sent in the same slot (such as 3 slots from the reception of the DCI 220-*a* and 2 slots from the reception of the DCI 220-*b*). The DAI value of 2 may indicate that the HARQ feedback for the PDSCH 225-*b* is the second HARQ feedback included in the report group (where the HARQ feedback for the PDSCH 225-*a* is the first HARQ feedback for the group). The G value may indicate that the two HARQ reports are in the same group (for example, both HARQ reports correspond to group index 0), the R value may indicate that HARQ feedback for group 0 is requested. The NFI value may indicate that there is no change in the reporting of prior HARQ groups (for example, because the NFI bit is not toggled between DCIs 220). In this implementation, the HARQ reports for a same PDSCH group may be carried in the same uplink transmission by the UE 115-*a*. For example, the feedback for both PDSCH 225-*a* and PDSCH 225-*b* may be transmitted in the same HARQ-ACK message 235-*a*, rather than in separate transmissions of HARQ-ACK messages 235-*a* and 235-*b*. In this example, the UE 115-*a* may send a single uplink transmission based on the HARQ codebook for the grouped HARQ feedback reports. In this example, the HARQ codebook may specify multiple bits indicating HARQ ACK/NACK information for the multiple PDSCHs 225 in the same PDSCH group. In some implementations, the number of bits may change, which may be based upon the number of HARQ reports included in the uplink transmission. A UE 115-*a* supporting these features (for example, dynamic group-based HARQ-ACK) may signal this information to the base station 105-*a*. A base station 105-*a* supporting these features (for example, dynamic group-based HARQ-ACK) may decode the information from the UE 115-*a* and determine whether the PDSCHs 225 in the PDSCH group were successfully received and decoded at the UE 115-*a*.

In some implementations, the base station 105-*a* may fail to receive a grouped HARQ feedback transmission from the UE 115-*a*. This could be due to a failure in communication between the base station 105-*a* and the UE 115-*a*, or, if communicating in an unlicensed spectrum, due to a failure in an LBT protocol. In these implementations, the base station 105-*a* may use a subsequent downlink transmission 215 to initiate retrieval of the non-received HARQ reports. For example, the base station 105-*a* may send a third downlink transmission 215 including a DCI 220-*c* and a PDSCH 225-*c*. The DCI 220-*c* may include a K1 value of 2, a DAI value of 3, a G value of 0, an R value of 0, and an NFI value of 0. The K1 value may indicate that the UE 115-*a* may send a feedback report 230 two slots after receiving the PDSCH 225-*c*. The UE 115-*a* may determine what information may be included in the feedback report. For example, information included the DCI (such as the DCI 220-*c*) in the third downlink transmission 215 may be compared to the DCI (such as the DCI 220-*a* and 220-*b*) for the previous downlink transmissions 215. The comparison may allow the UE 115-*a* to determine if the HARQ information associated with the third downlink transmission may be transmitted with a retransmission of HARQ information associated with the first and second downlink transmissions. For example, a G value of 0 and an NFI value of 0 (such as a non-toggling bit for the NFI value) in the third downlink group DCI 220-*c* may indicate that the HARQ report group has not changed. A DAI value of 3 may additionally indicate that the UE 115-*a* may include the corresponding HARQ information as the third HARQ ACK/NACK in the grouped HARQ report for the base station 105-*a*. A G value of 0 in the third DCI 220-*c* may indicate that the corresponding HARQ report may be grouped in the same HARQ-ACK message 235 as the previously grouped HARQ reports. In this example, the next HARQ report (such as a HARQ-ACK message 235-*b* or 235-*c*) may include grouped feedback information for the previously missed grouped HARQ report transmission (such as the HARQ-ACK message 235-*a* with feedback information for the PDSCH 225-*a* and the PDSCH 225-*b*).

In such implementations, the UE 115-*a* may transmit a single grouped HARQ report containing the HARQ information associated with all three downlink transmissions corresponding to the same PDSCH group. For example, the grouped HARQ report may be encoded based on a HARQ codebook and may include multiple bits to indicate an ACK or NACK for reception of each downlink transmission. In some implementations, the number of downlink messages with feedback reported in the grouped HARQ report may determine the number of bits included in the codebook. For example, HARQ feedback for three PDSCHs 225 may use fewer bits than HARQ feedback for six PDSCHs 225.

In some implementations, the UE 115-*a* may use dynamic group-based HARQ feedback in DRX mode. In some such implementations, the UE 115-*a* may send a grouped HARQ report when in an active mode and may subsequently enter an inactive mode. If the grouped HARQ report is not successfully received by the base station 105-*a*, the UE 115-*a* may be unable to receive a subsequent downlink transmission by the base station 105-*a* when the UE 115-*a* is inactive. If the UE 115-*a* does not receive the downlink transmission, it may be unable to determine that a subsequent uplink transmission requests HARQ information (such as in the HARQ codebook) associated with the missed grouped feedback. The UE 115-*a* may not receive the downlink transmission until a next active period for a subsequent DRX cycle, greatly increasing the latency involved in providing feedback to the base station 105-*a*. To extend the active duration of the UE 115-*a*, the UE 115-*a* may implement a timer, which can prevent the UE 115-*a* from entering an inactive mode for a period of time after a scheduled transmission opportunity for a dynamic grouped-based HARQ-ACK message. This timer may allow the UE 115-*a* to receive another DCI requesting retransmission of the feedback in a subsequent dynamic group-based HARQ message, improving the feedback latency for the UE 115-*a*.

Figure 3A:
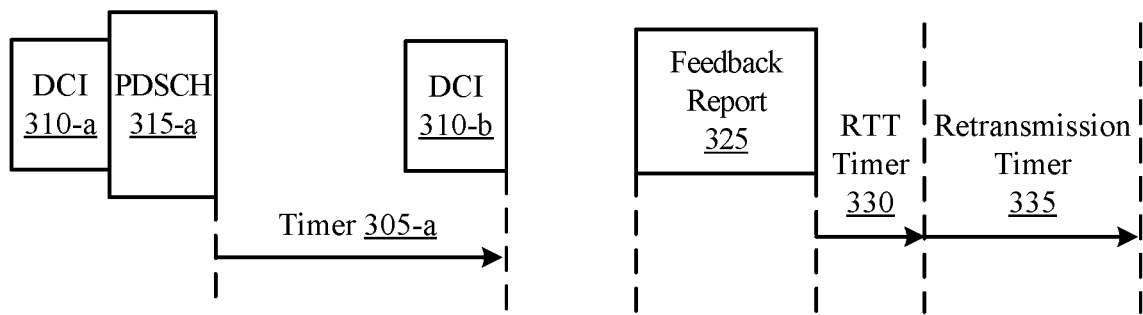
FIGS. 3A, 3B, 4A and 4B show examples of timelines that support HARQ handling for DRX.
Figure 3B:
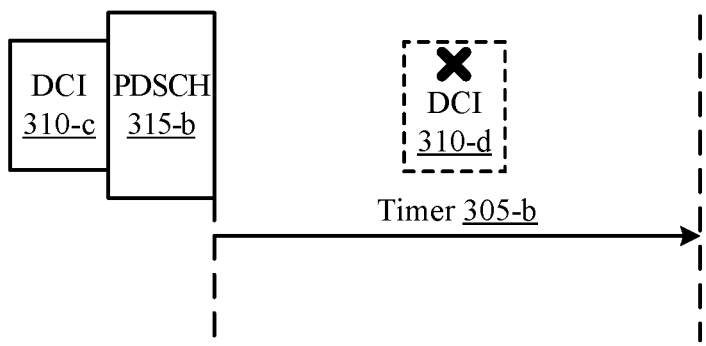

FIGS. 3A and 3B show examples of timelines 300 that support HARQ handling for DRX. FIG. 3A illustrates a first example timeline 300-*a*. In some examples, the feedback timeline 300-*a* may implement aspects of a wireless communications system 100 or 200. For example, the feedback timeline 300-*a* may correspond to a processing timeline at a UE 115 as described herein with reference to FIGS. 1 and 2.

In some examples, a UE 115 may operate in DRX mode. As discussed regarding the UE 115-*a* with reference to FIG. 2, a UE 115 operating in a DRX mode may have periods of inactive times where data transmission, data reception, or both are unavailable. While the UE 115 is operating in DRX mode, the UE 115 may receive a downlink transmission from a base station 105, which may include a DCI 310-*a* (for example, a first DCI message) and a PDSCH 315-*a* (for example, a data message). For example, the UE 115 may receive the downlink transmission while in an active state of the DRX mode. In some implementations, the DCI 310-*a* may include a field indicating scheduling for when a feedback report is to be sent by the UE 115. In some examples, this field may be a data-to-feedback timing indicator, such as a PDSCH-to-HARQ-timing-indicator. In some implementations, the PDSCH-to-HARQ-timing-indicator may be referred to as a K1 value. The K1 value may correspond to timing for a feedback report 325. The feedback report 325 may indicate an ACK or NACK for reception of the downlink transmission (for example, the DCI 310-*a*, the PDSCH 315-*a*, or both). For example, the DCI 310-*a* may include a field indicating a transmission opportunity for the UE 115 to transmit the feedback report 325. In some examples, the feedback report 325 may be an example of a HARQ-ACK message and may include HARQ ACK/NACK feedback for the reception of the DCI 310-*a* and the PDSCH 315-*a*.

In some implementations, the K1 value may be a numeric value (such as 1, 2, 3, etc.). The numeric K1 value may indicate the number of slots (or TTIs) after receiving the downlink transmission that the UE 115 may transmit the feedback report 325. However, in some examples, the K1 value may be a non-numeric value. As described with reference to FIG. 2, a non-numeric K1 value may trigger the UE 115 to store the feedback report information associated with the downlink transmission. For example, a non-numeric K1 value indicated in the DCI 310-*a* may cause the UE 115 to store the HARQ ACK/NACK report (such as the information for the feedback report 325) associated with receiving the PDSCH 315-*a*.

If a non-numeric K1 value is received in the DCI, the UE 115 may monitor for and receive a second downlink transmission (for example, a second DCI message) indicating when the feedback report 325 is scheduled to be sent. The second downlink transmission may include or be an example of a DCI 310-*b*. The DCI 310-*b* may include a numeric K1 value, and the UE 115 may transmit the stored feedback report 325 in the slot assigned by the numeric K1 value of the DCI 310-*b*.

However, in some examples when the UE 115 operates in DRX mode, the UE 115 may miss the transmission of the DCI 310-*b* (or a base station 105 may not schedule the transmission of the DCI 310-*b*) if the UE 115 returns to an inactive mode (such as a sleep mode) following reception of the first transmission. For example, in the inactive mode, the UE 115 may not monitor the downlink control channel for DCIs and, correspondingly, may not support reception of the DCI 310-*b*. For the UE 115 to reliably receive the DCI 310-*b* scheduling the feedback transmission, the UE 115 may remain in an active mode following reception of the first transmission to avoid missing receiving the DCI 310-*b* containing the numeric K1 value. The UE 115 may implement a timer triggered by a non-numeric K1 value to maintain the UE 115 in the active mode and support continued monitoring of the downlink control channel.

In some implementations, timers may be used to keep the UE 115 in the active mode. For example, the UE 115 may remain in an active mode until the expiration of one or more timers. A timer 305-*a* may be an example of a timer used to keep the UE 115 in the active mode. As described herein, the timer 305-*a* may be triggered based on receiving a DCI 310-*a* including a non-numeric K1 value for feedback timing. In some implementations, the timer 305-*a* may start in the first symbol immediately following the scheduled reception of the PDSCH 315-*a*. In some other implementations, however, the timer 305-*a* may start at a different time, such as the symbol immediately following the reception of the DCI 310-*a*. The UE 115 may remain in an active state for the duration of the timer 305-*a*. Specifically, the active time for the UE 115 may include the active runtime for the timer 305-*a*. The timer 305-*a* may end when the UE 115 receives a DCI 310-*b* indicating the feedback timing for sending the feedback report 325 to a base station 105. In some implementations, however, the timer 305-*a* may end at a different time, such as after transmitting the PUCCH or PUSCH transmission carrying the feedback report 325. In some implementations, the UE 115 may additionally implement an RTT timer 330 and a retransmission timer 335 to keep the UE 115 in an active state to receive a retransmission (for example, if the feedback report 325 includes a HARQ NACK). In some such implementations, the total active time that the UE 115 may be in the active mode may include the timer 305-*a*'s time, the RRT timer 330's time, the retransmission timer 335's time, or some combination thereof. For example, the total active time for a DRX cycle for the UE 115 may include the non-overlapping portions of runtime for an ON duration timer, an inactivity timer, the timer 305-*a*, and the retransmission timer 335.

The timer 305-*a* may be a timer specific to non-numeric K1 operations or a timer reused for multiple operations. In a first example, the timer 305-*a* may be a timer specific to handling non-numeric K1 values, such as a trigger timer (for example, a drx-DCItrigger-for-HARQ-Ack-TimerDL). The trigger timer may be activated specific to a particular HARQ feedback process. The trigger timer may set a new duration that the UE 115 may remain in an active mode based on receiving a DCI 310-*a* with a non-numeric K1 parameter (for example, in order to receive a subsequent DCI 310-*b*). In some implementations, a base station 105 may send a configuration of the trigger timer in a downlink transmission to the UE 115 (for example, in radio resource control (RCC) signaling). The duration of the trigger timer may be based on the HARQ feedback timing of the UE 115 and the base station 105, a value configured by the base station 105, the DRX operation of the UE 115, or some combination thereof. The HARQ process-specific trigger timer may start in a first symbol following the scheduled PDSCH 315-*a* and may run until the timer duration expires or may be deactivated based on receiving a DCI trigger (for example, the DCI 310-*b*) that indicates the timing for HARQ-ACK feedback (for example, transmitting the feedback report 325) of the corresponding HARQ process.

In some other examples, the timer 305-*a* may be a repurposed timer that supports multiple operations. For example, the timer 305-*a* may be a retransmission timer such as a drx-RetransmissionTimerDL. As described with reference to FIG. 2, the retransmission timer may be used to keep the UE 115 in an active mode while monitoring for a downlink retransmission from the base station 105. To support monitoring for retransmissions in response to a NACK, the retransmission timer 335 starts after the UE 115 sends a feedback report 325 (where the start of the retransmission timer 335 may be triggered based on the expiration of an RTT timer 330). Therefore, in some examples, the retransmission timer may be available to use during periods of time prior to transmitting the feedback report 325. In some implementations, the retransmission timer may be capable of supporting different durations (such as timer lengths) for different operations, which may be based upon separate RCC parameters. For example, a base station 105 may configure the UE 115 with a first retransmission timer duration and a second retransmission timer duration. The UE 115 may activate the retransmission timer with the first timer duration when triggered by an RTT timer 330 expiration and may activate the retransmission timer with the second timer duration when triggered by a DCI with a non-numeric K1 value. In such implementations, the retransmission timer may be used by the UE 115 as the timer 305-*a* and additionally as the retransmission timer 335. In some examples, the base station 105 may send an updated timer duration in a downlink transmission to the UE 115. The timer's duration may be based upon the HARQ feedback timing of the UE 115 and the base station 105, the timer duration indicated by the base station 105, or both.

In some other examples, the timer 305-*a* may be an inactivity timer such as a drx-InactivityTimer. As described with reference to FIG. 2, an inactivity timer may be used to keep the UE 115 in an active mode following reception of a DCI message indicating a new transmission (for example, a new downlink transmission or a new uplink transmission). In some implementations, the inactivity timer may start (or restart) based upon the indication of a new transmission. The UE 115 may maintain a single inactivity timer, rather than an inactivity timer for each HARQ process. Similar to above, the inactivity timer may be capable of supporting different durations (such as timer lengths), which may be based upon separate RCC parameters configured by the base station 105. The inactivity timer may be used by the UE 115 as the timer 305-*a* (for example, in addition to supporting new transmissions). For example, the UE 115 may activate the inactivity timer based on receiving a DCI indicating a new transmission (in a first operation of the inactivity timer) or a DCI indicating a non-numeric K1 value (in a second operation of the inactivity timer). These different operations may correspond to the same or different timer durations. In some implementations, the base station 105 may send an updated inactivity timer's duration in a downlink transmission to the UE 115. The timer's duration may be based upon the HARQ feedback timing of the UE 115 and the base station 105, the timer duration indicated by the base station 105, or both.

When the UE 115 stores feedback information for a HARQ process (for example, based on a non-numeric data-to-feedback timing indicator), implementing the timer 305-*a* to keep the UE 115 in an active state may allow the UE 115 to successfully receive the DCI 310-*b* indicating the timing for HARQ-ACK feedback for the HARQ process. Based on monitoring for and receiving the DCI 310-*b* with a numeric data-to-feedback timing indicator for the HARQ process, the UE 115 may send the feedback report 325 in the slot corresponding to the numeric value indicated in the DCI 310-*b*. Therefore, the timer 305-*a* may support the effective use of non-numeric K1 values by a UE 115 operating in a DRX mode. For example, the timer 305-*a* may reduce the latency involved in transmitting the feedback report 325, as the UE 115 implementing the timer 305-*a* may continue monitoring the downlink control channel while the timer 305-*a* is running and may receive the DCI 310-*b* based on the continued monitoring. Without such a timer, the UE 115 may enter an inactive mode and may not receive a transmit opportunity for the feedback report until a subsequent DRX cycle, resulting in significant latency for the feedback process.

FIG. 3B illustrates a second example timeline 300-*b*. In some examples, the feedback timeline 300-*b* may implement aspects of a wireless communications systems 100 or 200. The timeline 300-*b* may operate similarly to a timeline 300-*a*. For example, similar to the timeline 300-*a*, a UE 115 may operate in a DRX mode. While the UE 115 is operating in the DRX mode, the UE 115 may receive a downlink transmission from a base station 105, which may include a DCI 310-*c* and a PDSCH 315-*b*. In some implementations, the DCI 310-*c* may include a field indicating when a feedback report may be sent by the UE 115 indicating an ACK or NACK for the downlink data reception. The indication may be referred to as a K1 value, and the K1 value may be non-numeric. The non-numeric K1 value may trigger the UE 115 to store feedback report information associated with the DCI 310-*c* and the PDSCH 315-*b* in memory (for example, postponing the transmission of the feedback report). As described herein, the non-numeric K1 value may additionally trigger the UE 115 to activate a timer 305-*b* to keep the UE 115 monitoring the downlink control channel for a second DCI 310-*d*.

As illustrated in FIG. 3B, in some implementations, the UE 115 may not receive a second downlink transmission indicating feedback timing for sending the stored feedback report information (such as the DCI 310-*b* in FIG. 3A). In some such implementations, the UE 115 may not receive a numeric K1 value for the HARQ process (for example, based on missing a DCI 310-*d* with the numeric K1 value or based on a base station 105 not transmitting a DCI 310-*d* with the numeric K1 value. The UE 115 may continue to store the feedback report information until receiving feedback timing for the HARQ process. However, as described with reference to FIG. 2, the UE 115 operating in the DRX mode may cycle to an inactive mode to conserve power. The duration of time before the UE 115 enters the inactive mode (such as a sleep mode) may be determined by a set of timers managed by the UE 115.

The UE 115 may manage similar timers to those used in the timeline 300-*a*, including a timer specific to non-numeric K1 operations (such as a trigger timer) or a timer repurposed for multiple operations (such as a retransmission timer or inactivity timer). The UE 115 may go to sleep (enter an inactive mode) if a timer maintaining the active state expires and a set of other conditions are met (for example, any other timers maintaining the active state for the UE 115, including for other HARQ processes, are deactivated). For example, in the timeline 300-*b*, the timer 305-*b* may expire after a certain amount of time, rather than when a subsequent DCI 310-*d* is received. For example, the base station 105 may not transmit a DCI 310-*d* during this active time or the UE 115 may fail to receive a DCI 310-*d* during this active time. Therefore, the timer 305-*b* may run its full duration before expiring. If the other inactivity conditions are met when the timer 305-*b* expires, the UE 115 may cycle to an inactive mode. For example, the UE 115 may start the timer 305-*b* after the scheduled PDSCH 315-*b* (or after the DCI 310-*c* reception), and the timer 305-*b* may run for the duration configured by the base station 105 for handling non-numeric data-to-feedback timing indicators. If no other timers maintaining the active state are running at the UE 115 after the expiration of the timer 305-*b*, the UE 115 may enter an inactive mode and refrain from monitoring the downlink control channel while operating in the inactive state. Operating in the inactive state may save processing power at the UE 115.

Figure 4A:
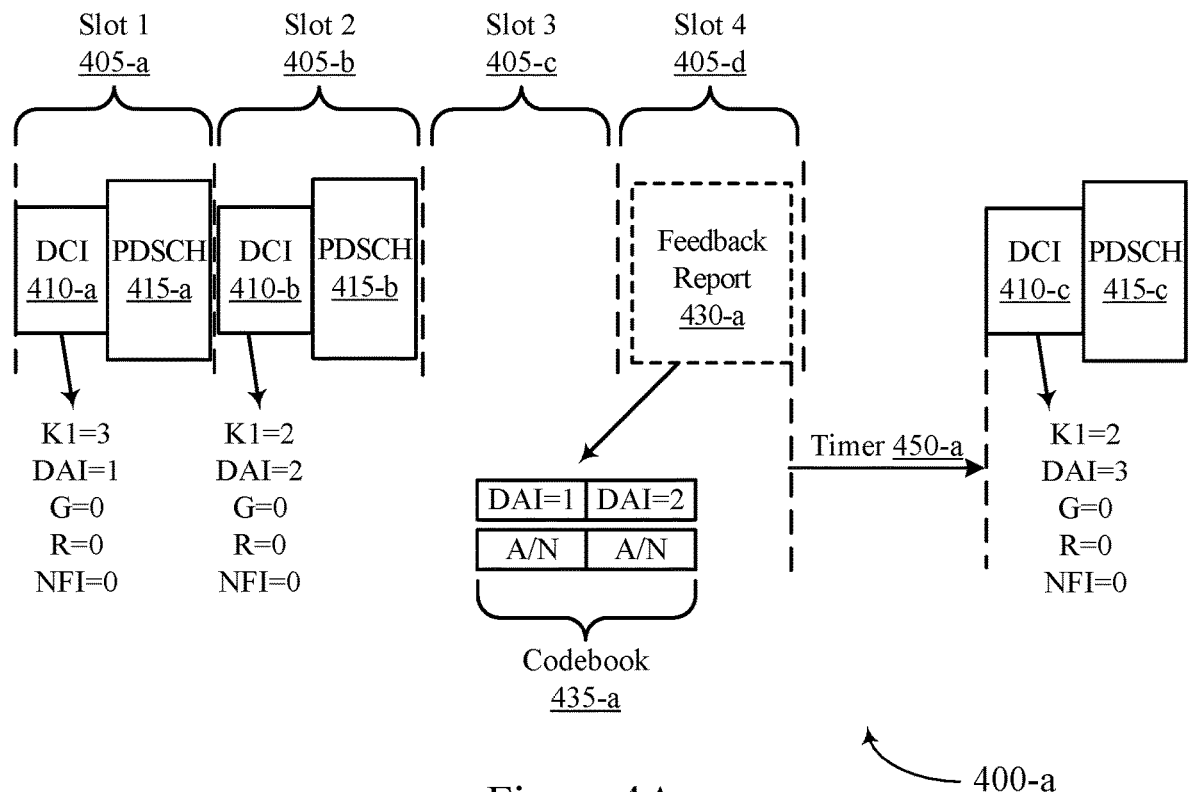
Figure 4B:
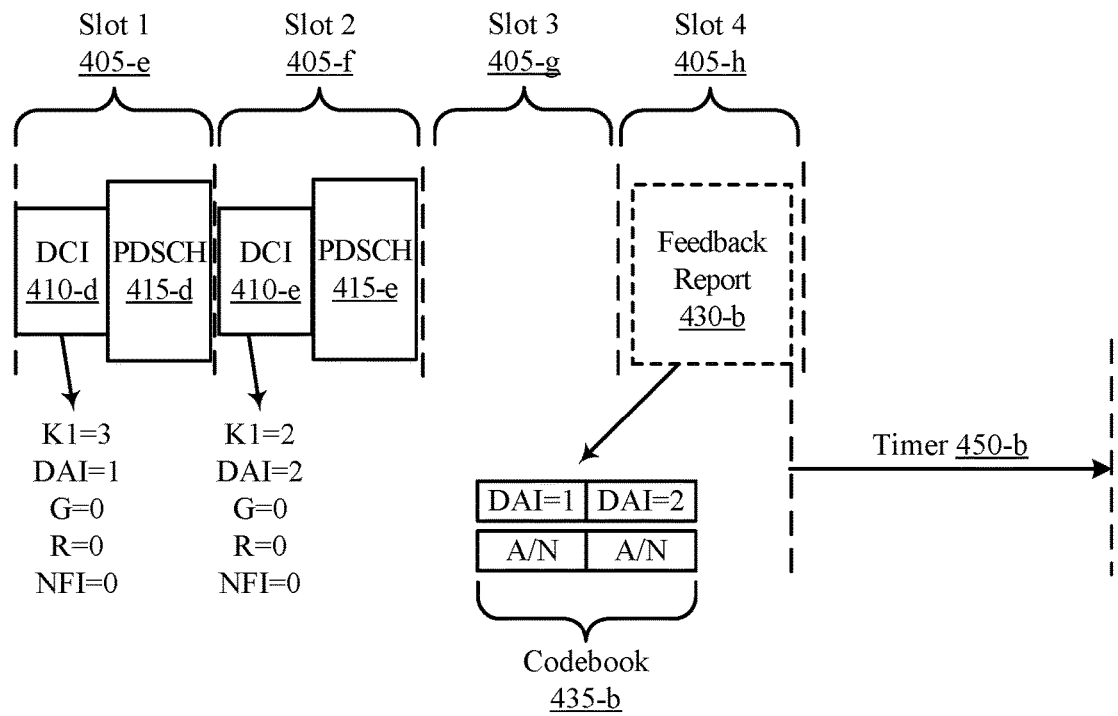

FIGS. 4A and 4B show examples of timelines 400 that support HARQ handling for DRX. FIG. 4A illustrates a first example timeline 400-*a*. In some examples, the feedback timeline 400-*a* may implement aspects of a wireless communications system 100 or 200. As described with reference to FIG. 2, feedback information for multiple downlink transmissions may be grouped into a single uplink transmission. The feedback information may be transmitted as a HARQ-ACK message, which may include one or more ACKs, one or more NACKs, or both according to a codebook 435. For example, a UE 115 may group the HARQ ACK/NACK into a single HARQ codebook 435 and transmit the HARQ ACK/NACK to a base station 105 in a feedback report 430.

As described with reference to FIG. 2, DCI contained in multiple downlink transmissions received at a UE 115 may be used to coordinate the information sent by the UE 115 in an uplink transmission, such as an uplink feedback transmission. For example, K1 values, DAI values (for example, cDAI, tDAI, or both), G values, R values, NFI values, or some combination thereof may be sent to the UE 115 in DCI messages. The UE 115 may compare these values and determine which HARQ ACK/NACK information may be grouped together and returned in a single feedback report 430 according to a shared HARQ codebook 435.

In some implementations, the UE 115 may receive a first downlink transmission, which may include a DCI 410-*a* and a PDSCH 415-*a* in a first slot 405-*a*. The DCI 410-*a* may schedule the transmission of the PDSCH 415-*a* and may include a K1 value of 3, a DAI value of 1, a G value of 0, an R value of 0, and an NFI value of 0. Additionally, the UE 115 may receive a second downlink transmission, which may include a DCI 410-*b* and a PDSCH 415-*b* in second slot 405-*b*. The DCI 410-*b* may schedule the transmission of the PDSCH 415-*b* and may include a K1 value of 2, a DAI value of 2, a G value of 0, an R value of 0, and an NFI value of 0. The UE 115 may receive the downlink transmissions based on operating in an active state during a DRX cycle.

The received DCI values may be used to determine how to transmit the HARQ ACK/NACK information for the received downlink transmissions. For example, the DCI values may indicate to the UE 115 to group the first and second downlink transmissions together and transmit the feedback information associated with the first and second downlink transmissions using a single HARQ codebook 435-*a*. The grouping may be based on a comparison of the K1 values, the DAI values, the G values, the R values, the NFI values, or some combination thereof for the downlink groups. For example, the G values of 0 may indicate that both DCIs 410 correspond to a same group with group index 0, the DAI values may indicate that the first DCI 410-a is for a first HARQ process for this group and the second DCI 410-b is for a second HARQ process for this group, the NFI values may indicate that the feedback information for these DCIs 410 correspond a same HARQ-ACK feedback group for this group, and the K1 values indicate that the feedback for both of these transmissions is scheduled for a same slot 405-d. The UE 115 may input the feedback information for the two downlink transmissions into the HARQ codebook 435-a based on these DCI values and may transmit a single feedback report 430-a based on this HARQ codebook 435-a in a single uplink transmission to the base station 105 in a fourth slot 405-d (in this example, one slot after an empty slot 405-c based on the K1 values).

In some implementations, the base station 105 may not successfully receive and decode the feedback report 430-a. This may be due to an LBT failure at the UE 115 (where the feedback report 430-a is not transmitted in the scheduled transmission opportunity for the feedback report 430-a) or a misdetection at the base station 105. In such implementations, the HARQ ACK/NACK information in the HARQ codebook 435-a may not be received by the base station 105. To re-request this HARQ ACK/NACK information, the base station 105 may transmit a third downlink transmission to the UE 115, which may include a DCI 410-c, a PDSCH 415-c, or both. The K1 value, DAI value, G value, R value, NFI value, or some combination thereof for the third downlink transmission may be compared to these values for the first and second downlink transmissions. The UE 115 may determine if at least a portion of the information from the previously scheduled group feedback report 430-a is requested for transmission in an additional feedback report scheduled by the third downlink transmission (not shown).

As described with reference to FIG. 2, the UE 115 may operate in a DRX mode. While operating in the DRX mode, the UE 115 may be active for one or more time periods and inactive for other time periods. In some implementations, a UE 115 operating in a DRX mode may enter an inactive mode following a scheduled transmission opportunity for a feedback report 430-a. For example, if the UE 115 fails to transmit the feedback report 430-a based on failing to access an uplink channel in an unlicensed spectrum, or if the UE 115 transmits a feedback report 430-a without any NACKs, the UE 115 may not activate any timers to keep the UE 115 in the active state. In some such implementations, a third downlink transmission (such as a DCI 410-c) may not be received by the UE 115. If the base station 105 determines to re-request HARQ-ACK information initially scheduled for the feedback report 430-a transmission opportunity, the UE 115 may receive this request during a next active mode of the UE 115 (for example, in a subsequence DRX cycle). This may introduce significant latency to both the UE 115 and the base station 105, as the DRX timing may delay the transmission of the feedback report 430 to the base station 105 based on the UE 115 returning to sleep after the feedback report 430-a transmission opportunity.

Due to the group-based feedback capabilities of the UE 115, the UE 115 may implement a timer 450-a to maintain an active state and continue monitoring the downlink control channel. The base station 105 may successfully re-request feedback information (for example, HARQ ACK/NACK bits) using a third DCI 410-c based on the UE 115 monitoring the downlink control channel. This re-request may be accomplished by the base station 105 sending a non-toggled NFI value (such as 0) in the DCI 410-c for the group 0, which may indicate that the next feedback report transmission is requested to include the previously missed feedback information (such as the feedback information in the HARQ codebook 435-a) for the group 0. Alternatively, the re-request may be accomplished using an R value to request feedback for another PDSCH group, which may include the group 0 corresponding to the feedback information in the HARQ codebook 435-a. By implementing the timer 450-a, the UE 115 may effectively extend its active time, supporting reception of the third DCI 410-c and the corresponding request for feedback retransmission.

In some implementations, the timer 450-a may be used for feedback processes for a UE 115 configured with dynamic group-based HARQ (or other similar feedback processes). For example, the timer 450-a may be used to hold the UE 115 in an active mode following a scheduled transmission opportunity for a feedback message, such as the feedback report 430-a. The UE 115 may remain in the active mode (such as transmitting and receiving data, monitoring the downlink control channel, etc.) until the expiration of the timer 450-a (and until another set of criteria is met). In some implementations, the timer 450-a may start in the first symbol immediately following the opportunity to transmit the feedback report 430-a. In some other implementations, however, the timer 450-a may start at a different time. In some implementations, a UE 115 configured with dynamic group-based HARQ-ACK may activate the timer 450-a after each feedback transmission opportunity. In some other implementations, the UE 115 may not activate the timer 450-a if the UE 115 transmits the feedback report 430-a in the scheduled feedback transmission opportunity. The UE 115 may remain in an active state for the duration of the timer 450-a, and the UE 115's active time may include the timer 450-a's active time. The timer 450-a may stop when its timer duration expires or when a DCI trigger is identified (for example, after the end of PDCCH reception). For example, in some implementations, the timer 450-a may stop when the UE 115 receives any DCI 410. In some other implementations, the timer 450-a may stop when the UE 115 receives a DCI 410 scheduling a downlink data transmission (such as a PDSCH 415). In yet other implementations, the timer 450-a may stop when the UE 115 receives a DCI 410-c indicating a PDSCH 415-c and including an indication that the HARQ ACK/NACK feedback for the PDSCH 415-c may be grouped in the same grouped feedback report as the previously scheduled feedback report 430-a (for example, based on the NFI value, G value, R value, DAI value, or combination thereof as discussed previously).

The use of the timer 450-a to hold the UE 115 in the active state may allow for the UE 115 to successfully receive the third DCI 410-c. This may allow the UE 115 to group missed feedback information from a first downlink transmission, a second downlink transmission, or a combination thereof with information from the third downlink transmission. Therefore, the timer 450-a may support efficient transmission of group-based feedback by the UE 115 operating in DRX mode.

FIG. 4B illustrates a second example timeline 400-b. In some examples, the feedback timeline 400-b may implement aspects of a wireless communications systems 100 or 200. Similar to the timeline 400-a, feedback information for multiple downlink transmissions may be grouped into a single uplink transmission, which may include HARQ ACK/NACK. The HARQ ACK/NACK may be grouped into a single HARQ codebook 435 and transmitted to a base station 105 in a single uplink transmission. The DCI 410 received by a UE 115 may be used to coordinate the information sent by the UE 115 in the uplink transmission. For example, DCI parameters, such as K1 values, DAI values (cDAI, tDAI, or both), G values, R values, and NFI values may indicate to the UE 115 how to group PDSCHs 415 for feedback. The UE 115 may compare these values and determine which HARQ ACK/NACK information may be grouped and returned in a single uplink transmission (for example, a feedback report 430-*b*) using a shared HARQ codebook 435-*b*.

Similar to the timeline 400-*a*, a first downlink transmission may be received by the UE 115, which may include a DCI 410-*d* and a PDSCH 415-*d* in a first slot 405-*e*. The first downlink transmission may include a K1 value of 3, a DAI value of 1, a G value of 0, an R value of 0, and an NFI value of 0. Similarly, a second downlink transmission may be received by the UE 115, which may include a DCI 410-*e* and a PDSCH 415-*e* in a second slot 405-*f*. The second downlink transmission may include a K1 value of 2, a DAI value of 2, a G value of 0, an R value or 0, and an NFI value of 0. These values may be used to determine that the HARQ ACK/NACK information associated with receiving the first and second downlink data transmissions may be grouped into a single HARQ codebook 435-*b*. The UE 115 may transmit the feedback information based on the HARQ codebook 435-*b* in a single feedback report 430-*b* to a base station 105 in a fourth slot 405-*h* (following a third slot 405-*g* based on the K1 values).

Similar to the timeline 400-*a*, the base station 105 may not receive the feedback report 430-*b*, which may be due to an LBT failure at the UE 115 or a misdetection at the base station 105. Correspondingly, the HARQ ACK/NACK information in the HARQ codebook 435-*a* may not be received by the base station 105. Similar to the timeline 400-*a*, the UE 115 may operate in a DRX mode and may be active for a time period and inactive for other time periods. The UE 115 may implement a timer 450-*b* in order to extend the active time of the UE 115 and allow for the reception of a third downlink transmission effectively requesting some of the HARQ ACK/NACK bits previously scheduled to be sent. This timer 450-*b* may not be specific to any particular HARQ process.

The timer 450-*b* may be used to hold the UE 115 in an active mode, and the UE 115 may remain in the active mode until at least the expiration of the timer 450-*b*. The timer 450-*b* may start in a first symbol immediately following the scheduled transmission opportunity for the feedback report 430-*b*. In some implementations, however, the timer 450-*b* may start at a different time. Similarly, in some implementations, the timer 450-*b* may not start if the feedback report 430-*b* is transmitted by the UE 115 due to a successful LBT procedure. The UE 115 may remain in an active state for the duration of the timer 450-*b*. However, in some examples, the timer 450-*b* may expire after a certain amount of time (the timer's duration, which may be configured by the base station 105 via RRC or other signaling). For example, the UE 115 may not receive another DCI 410 while the timer 450-*b* is running. In some other examples, the UE 115 may receive a DCI 410 that may indicate an uplink grant or a DCI for another feedback group, either of which may not trigger expiration of the timer 450-*b* in some implementations (for example, according to the deactivation triggers configured for the timer 450-*b*). Therefore, the timer 450-*b* may run for the duration of the timer 450-*b* and expire. If no other timers maintaining the active state for the UE 115 are running after the expiration of the timer 450-*b*, the UE 115 may enter an inactive mode and stop monitoring the downlink control channel based on the timer expiration.

Figure 5:
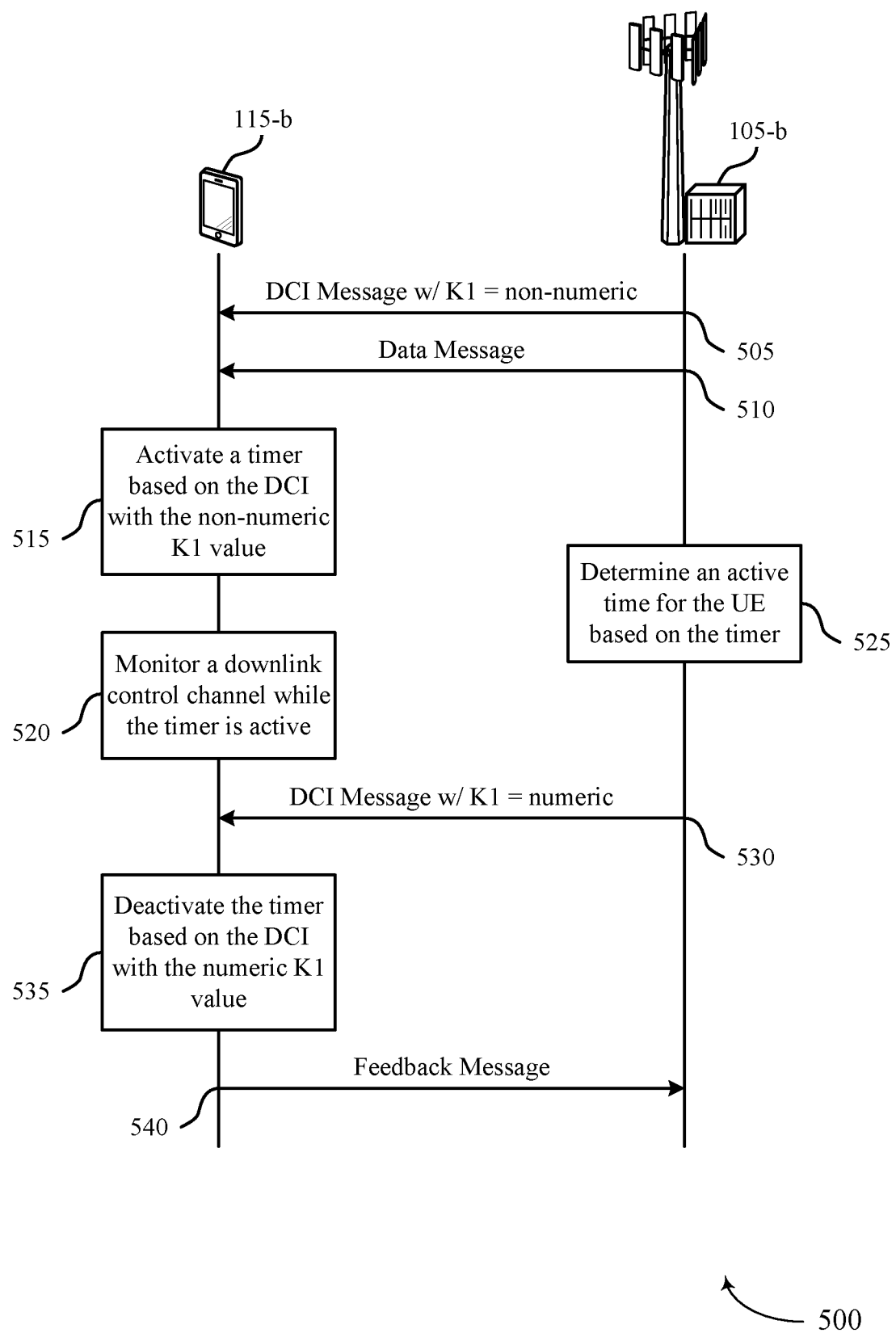
FIGS. 5 and 6 show examples of process flows that support HARQ handling for DRX.

FIG. 5 shows an example of a process flow 500 that supports HARQ handling for DRX. For example, the process flow 500 may illustrate a UE 115-*b* and a base station 105-*b* handling a DCI message with a non-numeric data-to-feedback timing indicator, K1. The UE 115-*b* and the base station 105-*b* may be examples of the corresponding wireless devices described with reference to FIGS. 1 and 2. The UE 115-*b* may maintain a timer as described with reference to FIGS. 3A and 3B. Alternative examples of the following may be implemented, where some steps are performed in a different order than described or are not performed at all. In some implementations, steps may include additional features not mentioned below, or further steps may be added.

At 505, a base station 105-*b* may transmit a DCI message to a UE 115-*b* on a downlink control channel. The DCI message may indicate a non-numeric value for a data-to-feedback timing indicator (for example, a K1 value), where the DCI message schedules a downlink data message and the data-to-feedback indicator is associated with feedback timing for the downlink data message. The non-numeric value may be an example of a negative number, a null value, or some similar value not indicating actual feedback timing. At 510, the base station 105-*b* may transmit the downlink data message to the UE 115-*b*. The UE 115-*b* may attempt to receive and decode the downlink data message. The UE 115-*b* may determine feedback information (for example, HARQ feedback, such as an ACK or NACK) for the downlink data message based on whether the data message is successfully received and decoded, and the UE 115-*b* may store the feedback information in memory based on the non-numeric value for the data-to-feedback timing indicator.

At 515, the UE 115-*b* may activate a timer based on receiving the DCI message at 505 and based on the data-to-feedback timing indicator being the non-numeric value. The UE 115-*b* may activate the timer in a first symbol after receiving the DCI message or in a first symbol after the scheduled downlink data message. The timer may maintain the UE 115-*b* in an active mode. For example, at 520, the UE 115-*b* may monitor the downlink control channel while the timer is active. In some implementations, the timer may be an example of a drx-DCItrigger-for-HARQ-ACK-TimerDL or some similar timer. In some other implementations, the timer may be an example of a drx-RetransmissionTimerDL, a drx-InactivityTimer, or some similar timer.

At 525, the base station 105-*b* may determine an active timer for the UE 115-*b* to monitor the downlink control channel based on the timer, where the timer is activated based on the DCI and on the data-to-feedback timing indicator being the non-numeric value. At 530, the base station 105-*b* may transmit, to the UE 115-*b* on the downlink control channel, a second DCI message indicating feedback timing for the downlink data message. The base station 105-*b* may determine the timing for transmitting the second DCI message based on the active time for the UE 115-*b* to monitor the downlink control channel. The second DCI message may indicate actual feedback timing (for example, a specific slot) for the feedback transmission using a numeric data-to-feedback timing indicator.

At 530, the UE 115-*b* may receive the second DCI message indicating the feedback timing for the downlink data message based on monitoring the downlink control channel while the timer is active. In some implementations, at 535, the UE 115-*b* may deactivate the timer based on receiving the second DCI message indicating the feedback timing for the downlink data message. The timer may be deactivated in the first symbol after receiving the second DCI message or in a first symbol after a feedback transmission. For example, at 540, the UE 115-*b* may transmit a feedback message (for example, a HARQ-ACK message) to the base station 105-*b* for the downlink data message and based on the feedback timing indicated in the second DCI message received at 530.

Figure 6:
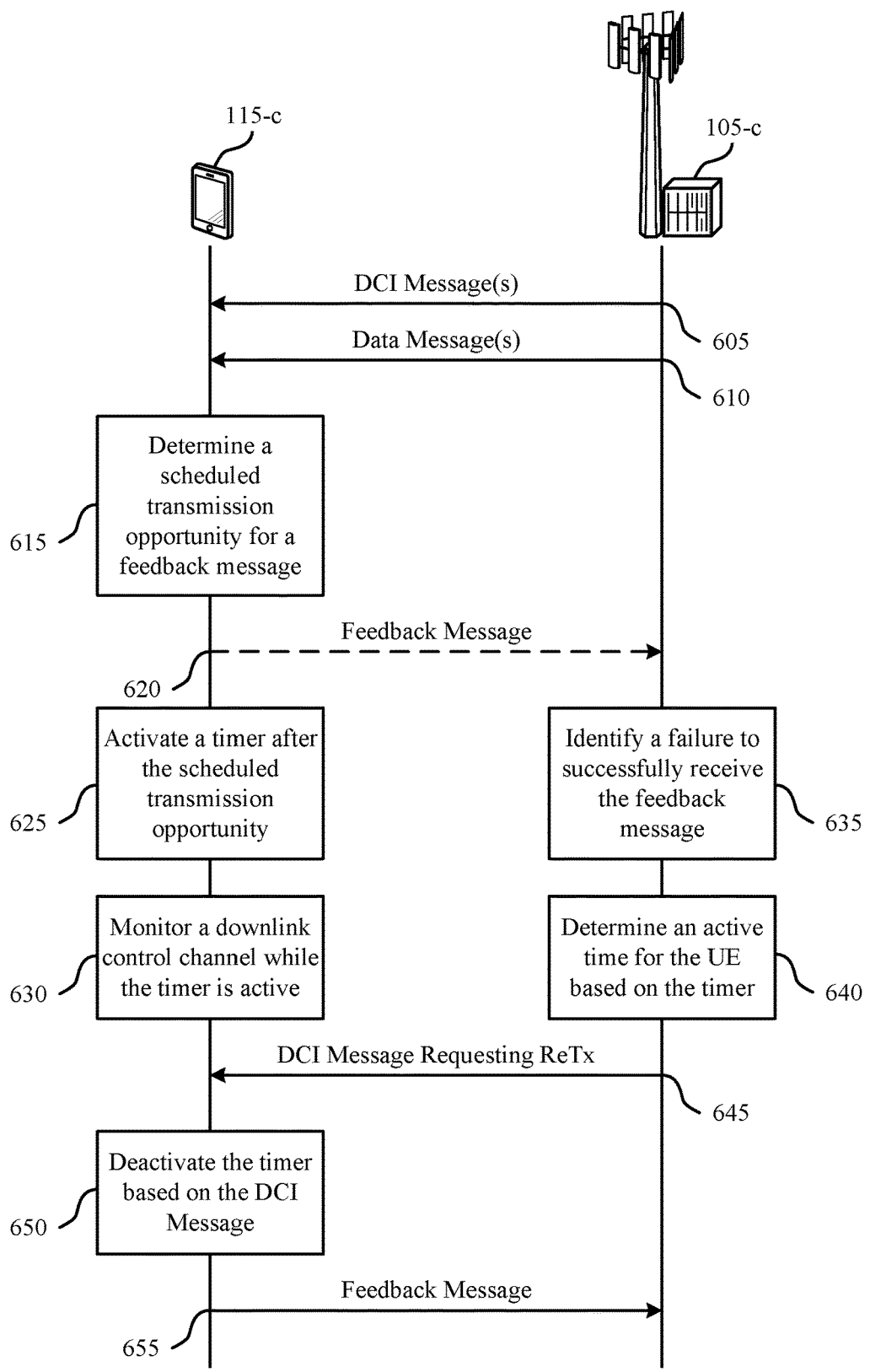

FIG. 6 shows an example of a process flow 600 that supports HARQ handling for DRX. For example, the process flow 600 may illustrate a UE 115-*c* and a base station 105-*c* handling feedback when the UE 115-*c* is configured with dynamic group-based HARQ-ACK. The UE 115-*c* and the base station 105-*c* may be examples of the corresponding wireless devices described with reference to FIGS. 1, 2, and 5. The UE 115-*c* may maintain a timer as described with reference to FIGS. 4A and 4B. Alternative examples of the following may be implemented, where some steps are performed in a different order than described or are not performed at all. In some implementations, steps may include additional features not mentioned below, or further steps may be added.

At 605, a base station 105-*c* may transmit, to a UE 115-*c* on a downlink control channel, one or more DCI messages scheduling transmissions of downlink data messages and including data-to-feedback timing indicators indicating a scheduled transmission opportunity. For example, each of the downlink data messages may be associated with a same PDSCH group for HARQ feedback based on the respective DCI message. At 610, the base station 105-*c* may additionally transmit the one or more downlink data messages to the UE 115-*c*.

At 615, the UE 115-*c* may determine the scheduled transmission opportunity for a feedback message including feedback information for the set of downlink data messages (for example, downlink data messages corresponding to a same PDSCH group scheduled for feedback). At 620, the UE 115-*c* may attempt to transmit the feedback message to the base station 105-*c* in the scheduled transmission opportunity. In some implementations, the UE 115-*c* may fail to gain access to an uplink channel to transmit the feedback based on a failed LBT procedure. In some other implementations, the base station 105-*c* may fail to successfully receive and decode the feedback message at 620.

At 625, the UE 115-*c* may activate a timer in a first symbol after the scheduled transmission opportunity for the feedback message. In some implementations, the UE 115-*c* may activate the timer based on operating with dynamic group-based HARQ-ACK. In some other implementations, the UE 115-*c* may activate the timer based on failing the LBT procedure and not transmitting the feedback message. At 630, the UE 115-*c* may monitor the downlink control channel while the timer is active.

At 635, the base station 105-*c* may identify a failure to successfully receive the feedback message in the scheduled transmission opportunity (for example, based on the LBT failure or misdetection at the base station 105-*c*). The missed feedback message may include the feedback information for the downlink data messages. At 640, the base station 105-*c* may determine an active timer for the UE 115-*c* to monitor the downlink control channel based on the timer, where the timer is activated in a first symbol after the scheduled transmission opportunity.

At 645, the base station 105-*c* may transmit, to the UE 115-*c* on the downlink control channel, a second DCI message requesting transmission (for example, re-requesting transmission or requesting retransmission) of at least a portion of the feedback information for the downlink data messages based on the determined active time for the UE 115-*c* and based on the failure to receive the feedback message. At 650, the UE 115-*c* may deactivate the timer based on receiving any DCI message, any DCI message scheduling a transmission of a downlink data message, a specific DCI message requesting transmission of at least a portion of the feedback information for the one or more downlink data messages, or a combination thereof. At 655, the UE 115-*c* may transmit the feedback message (for example, a HARQ-ACK message) to the base station 105-*c* based on the second DCI received at 645.

Figure 7:
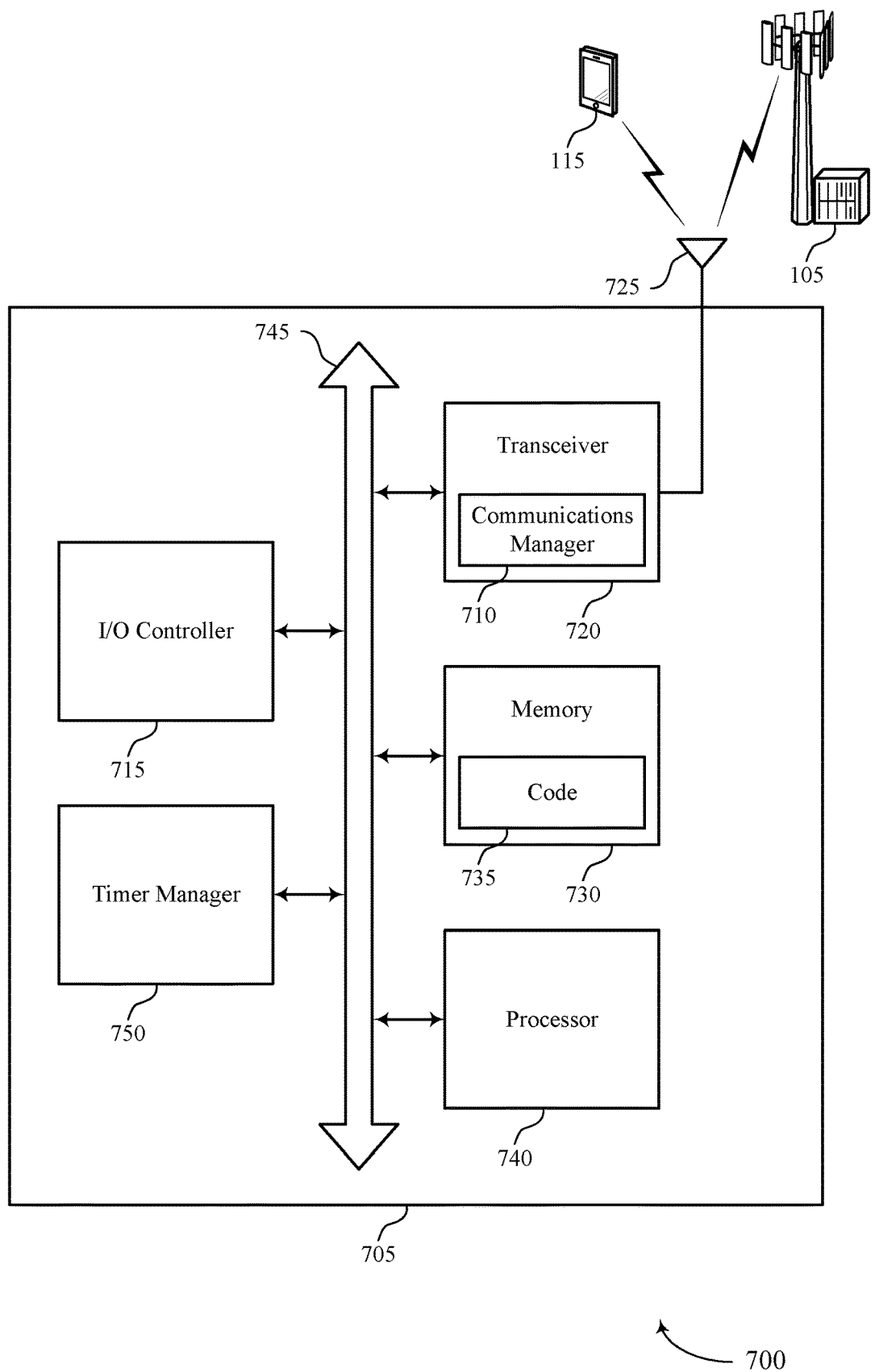
FIG. 7 shows a block diagram of an example user equipment (UE).

FIG. 7 shows a block diagram of an example UE 115. The UE 115 (for example, a device 705) may be a component of a system 700 that supports HARQ handling for DRX. The device 705 may include components for bi-directional voice and data communications including components for transmitting and receiving communications, such as a communications manager 710, an input/output (I/O) controller 715, a transceiver 720, an antenna 725, memory 730, a processor 740, and a timer manager 750. These components may be in electronic communication via one or more buses (such as a bus 745).

In some implementations, the communications manager 710 may receive a first DCI message indicating a non-numeric value for a data-to-feedback timing indicator (for example, a K1 value), where the first DCI message schedules a downlink data message and the data-to-feedback timing indicator is associated with feedback timing for the downlink data message. The timer manager 750 may activate a timer based on receiving the first DCI message and based on the data-to-feedback timing indicator being the non-numeric value. The communications manager 710 may monitor a downlink control channel while the timer is active and may receive a second DCI message indicating the feedback timing for the downlink data message (for example, using a numeric K1 value) based on monitoring the downlink control channel. The timer manager 750 may deactivate the timer based on receiving the second DCI message indicating the feedback timing for the downlink data message.

In some other implementations, the communications manager 710 may determine a scheduled transmission opportunity for a feedback message including feedback information for one or more downlink data messages. The timer manager 750 may activate a timer in a first symbol after the scheduled transmission opportunity for the feedback message. The communications manager 710 may monitor a downlink control channel while the timer is active and may receive a DCI message requesting transmission of at least a portion of the feedback information for the one or more downlink data messages. The timer manager 750 may deactivate the timer based on receiving the DCI message.

The I/O controller 715 may manage input and output signals for the device 705. The I/O controller 715 also may manage peripherals not integrated into the device 705. In some implementations, the I/O controller 715 may represent a physical connection or port to an external peripheral. In some implementations, the I/O controller 715 may utilize an operating system such as iOS®, ANDROID®, MS-DOS®, MS-WINDOWS®, OS/2®, UNIX®, LINUX®, or another known operating system. In some other implementations, the I/O controller 715 may represent or interact with a modem, a keyboard, a mouse, a touchscreen, or a similar device. In some implementations, the I/O controller 715 may be implemented as part of a processor. In some implementations, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 also may include a modem to modulate the packets and provide the modulated packets to the antennas for transmission, and to demodulate packets received from the antennas. In some implementations, the communications manager 710 may be a component of or connected to the transceiver 720.

In some examples, the wireless device may include a single antenna 725. However, in some other examples, the device may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some implementations, the memory 730 may contain, among other things, a basic I/O system (BIOS) which may control basic hardware or software operation such as the interaction with peripheral components or devices.

The processor 740 may include an intelligent hardware device (for example, a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some implementations, the processor 740 may be configured to operate a memory array using a memory controller. In some other implementations, a memory controller may be integrated into the processor 740. The processor 740 may be configured to execute computer-readable instructions stored in a memory (such as the memory 730) to cause the device 705 to perform various functions (for example, functions or tasks supporting HARQ in a DRX mode).

The code 735 may include instructions to implement aspects of the present disclosure, including instructions to support wireless communications. The code 735 may be stored in a non-transitory computer-readable medium such as system memory or other type of memory. In some examples, the code 735 may not be directly executable by the processor 740 but may cause a computer (when compiled and executed) to perform functions described herein.

Additionally, or alternatively, the device 705 may include one or more interfaces and a processing system. The processing system may be in electronic communication with the one or more interfaces. In some implementations, the interfaces and processing system may be components of a chip or modem, which may be a component of the device 705. The processing system and one or more interfaces may include aspects of the communications manager 710, the timer manager 750, the memory 730, the processor 740, or a combination thereof. The processing system and one or more interfaces also may be in electronic communication with the I/O controller 715, the transceiver 720, one or more antennas 725, or a combination thereof (such as via the bus 745).

For example, a first interface may be configured to obtain information from other components of the device 705. A second interface may be configured to output information to other components of the device 705. The information may be sent and received in the form of encoded or unencoded bits. The processing system may perform any number of processes to modify or determine the information output from the second interface.

In some implementations, the processing system may be configured to obtain, over the first interface, a first DCI message indicating a non-numeric value for a data-to-feedback timing indicator, where the first DCI message schedules a downlink data message and the data-to-feedback timing indicator is associated with feedback timing for the downlink data message. The processing system may be configured to activate a timer based on obtaining the first DCI message and on the data-to-feedback timing indicator being the non-numeric value, and the processing system may obtain, over the first interface, monitoring information for a downlink control channel while the timer is active. The processing system may be further configured to obtain, over the first interface, a second DCI message indicating the feedback timing for the downlink data message based on the monitoring information for the downlink control channel.

In some other implementations, the processing system may be configured to determine a scheduled transmission opportunity for a feedback message containing feedback information for one or more downlink data messages, activate a timer in a first symbol after the scheduled transmission opportunity for the feedback message, and obtain, over the first interface, monitoring information for a downlink control channel while the timer is active. The processing system may be configured to obtain, over the first interface, a DCI message requesting transmission of at least a portion of the feedback information for the one or more downlink data messages and may deactivate the timer based on obtaining the DCI message.

Figure 8:
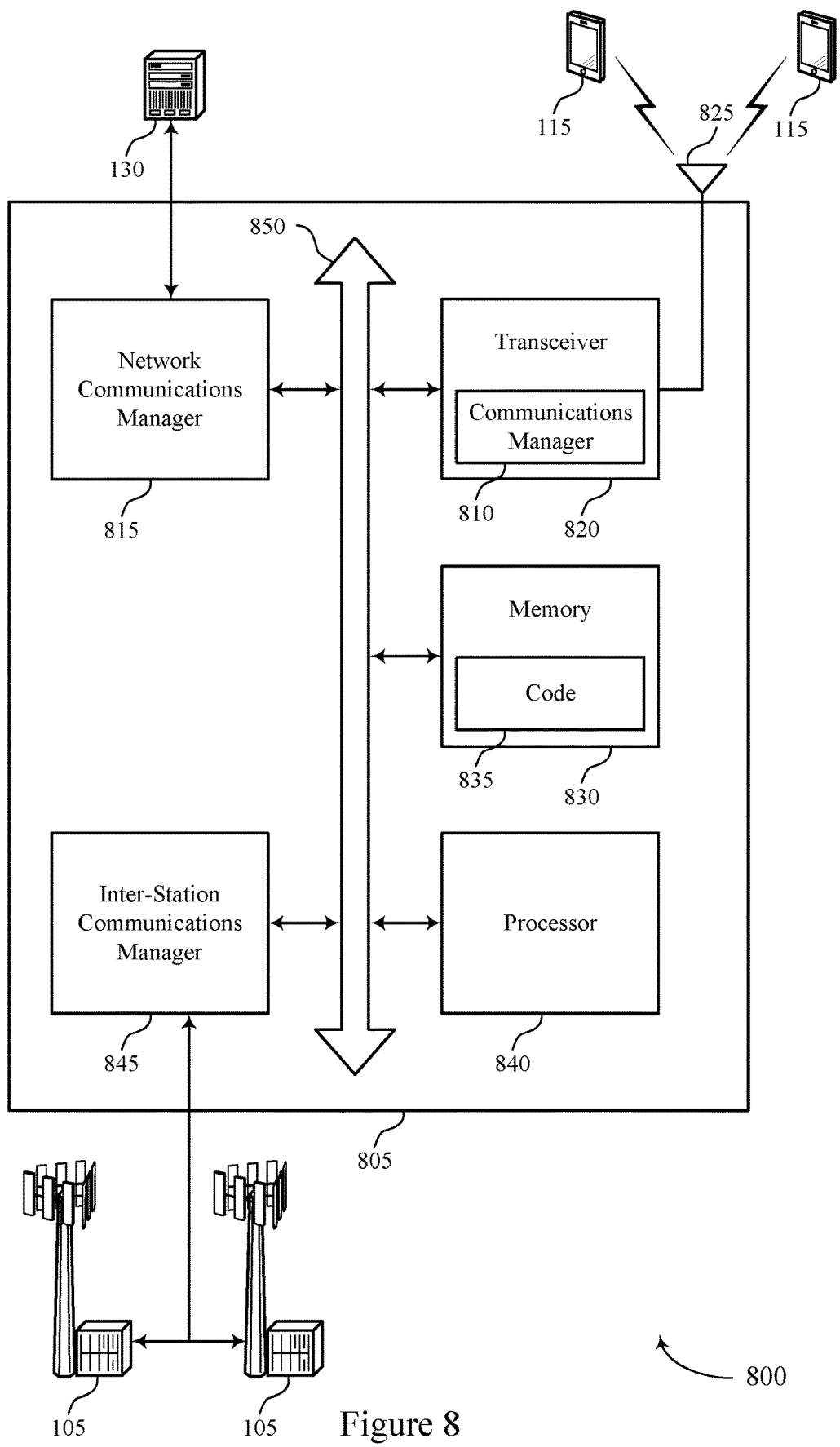
FIG. 8 shows a block diagram of an example base station (BS).

FIG. 8 shows a block diagram of an example base station 105. The base station 105 (for example, a device 805) may be a component of a system 800 that supports HARQ handling for DRX. The device 805 may include components for bi-directional voice and data communications including components for transmitting and receiving communications, such as a communications manager 810, a network communications manager 815, a transceiver 820, an antenna 825, memory 830, a processor 840, and an inter-station communications manager 845. These components may be in electronic communication via one or more buses (such as a bus 850).

In some implementations, the communications manager 810 may transmit, to a UE 115 on a downlink control channel, a first DCI message indicating a non-numeric value for a data-to-feedback timing indicator, where the first DCI message schedules a downlink data message and the data-to-feedback timing indicator is associated with feedback timing for the downlink data message. The communications manager 810 may further determine an active time for the UE 115 to monitor the downlink control channel based on a timer, where the timer is activated based on the first DCI message and on the data-to-feedback timing indicator being the non-numeric value, and transmit, to the UE 115 on the downlink control channel, a second DCI message indicating the feedback timing for the downlink data message based on the determined active time for the UE 115 to monitor the downlink control channel.

In some other implementations, the communications manager 810 may transmit, to a UE 115 on a downlink control channel, a first DCI message scheduling a transmission of a downlink data message and including a data-to-feedback timing indicator corresponding to the downlink data message and indicating a scheduled transmission opportunity. The communications manager 810 may identify a failure to successfully receive a feedback message including feedback information for the downlink data message in the scheduled transmission opportunity, determine an active time for the UE 115 to monitor the downlink control channel based on a timer, where the timer is activated in a first symbol after the scheduled transmission opportunity, and transmit, to the UE 115 on the downlink control channel, a second DCI message requesting transmission of at least a portion of the feedback information for the downlink data message based on the determined active time for the UE 115 to monitor the downlink control channel and identifying the failure to successfully receive the feedback message.

The network communications manager 815 may manage communications with the core network 130 (for example, via one or more wired backhaul links). For example, the network communications manager 815 may manage the transfer of data communications for client devices, such as one or more UEs 115.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 also may include a modem to modulate the packets and provide the modulated packets to the antennas for transmission, and to demodulate packets received from the antennas. In some implementations, the communications manager 810 may be a component of or connected to the transceiver 820.

In some examples, the wireless device may include a single antenna 825. However, in some other examples, the device may have more than one antenna 825, which may be capable of concurrently transmitting or receiving multiple wireless transmissions.

The memory 830 may include RAM, ROM, or a combination thereof. The memory 830 may store computer-readable code 835 including instructions that, when executed by a processor (such as the processor 840) cause the device to perform various functions described herein. In some implementations, the memory 830 may contain, among other things, a BIOS which may control basic hardware or software operation such as the interaction with peripheral components or devices.

The processor 840 may include an intelligent hardware device (for example, a general-purpose processor, a DSP, a CPU, a microcontroller, an ASIC, an FPGA, a programmable logic device, a discrete gate or transistor logic component, a discrete hardware component, or any combination thereof). In some implementations, the processor 840 may be configured to operate a memory array using a memory controller. In some examples, a memory controller may be integrated into the processor 840. The processor 840 may be configured to execute computer-readable instructions stored in a memory (for example, the memory 830) to cause the device 805 to perform various functions (such as functions or tasks supporting HARQ handling for DRX).

The inter-station communications manager 845 may manage communications with other base station 105 and may include a controller or scheduler for controlling communications with UEs 115 in cooperation with other base stations 105. For example, the inter-station communications manager 845 may coordinate scheduling for transmissions to UEs 115 for various interference mitigation techniques such as beamforming or joint transmission. In some examples, the inter-station communications manager 845 may provide an X2 interface within an LTE/LTE-A wireless communication network technology to provide communication between base stations 105.

The code 835 may include instructions to implement aspects of the present disclosure, including instructions to support wireless communications. The code 835 may be stored in a non-transitory computer-readable medium such as system memory or other type of memory. In some implementations, the code 835 may not be directly executable by the processor 840 but may cause a computer (when compiled and executed) to perform functions described herein.

Additionally, or alternatively, the device 805 may include one or more interfaces and a processing system. The processing system may be in electronic communication with the one or more interfaces. In some implementations, the interfaces and processing system may be components of a chip or modem, which may be a component of the device 805. The processing system and one or more interfaces may include aspects of the communications manager 810, the memory 830, the processor 840, or a combination thereof. The processing system and one or more interfaces also may be in electronic communication with the network communications manager 815, the inter-station communications manager 845, the transceiver 820, one or more antennas 825, or a combination thereof (such as via the bus 850).

For example, a first interface may be configured to output information to other components of the device 805. A second interface may be configured to obtain information from other components of the device 805. The information may be sent and received in the form of encoded or unencoded bits. The processing system may perform any number of processes to modify or determine the information output from the second interface.

In some implementations, the processing system may be configured to output, over the first interface to a UE 115 on a downlink control channel, a first DCI message indicating a non-numeric value for a data-to-feedback timing indicator, where the first DCI message schedules a downlink data message and the data-to-feedback timing indicator is associated with feedback timing for the downlink data message. The processing system may be further configured to determine an active time for the UE 115 to monitor the downlink control channel based on a timer, where the timer is activated based on the first DCI message and on the data-to-feedback timing indicator being the non-numeric value, and output, over the first interface to the UE 115 on the downlink control channel, a second DCI message indicating the feedback timing for the downlink data message based on the determined active time for the UE to monitor the downlink control channel.

In some other implementations, the processing system may be configured to output, over the first interface to a UE 115 on a downlink control channel, a first DCI message scheduling a transmission of a downlink data message and including a data-to-feedback timing indicator corresponding to the downlink data message and indicating a scheduled transmission opportunity. The processing system may be further configured to identify a failure to successfully obtain a feedback message including feedback information for the downlink data message in the scheduled transmission opportunity, determine an active time for the UE 115 to monitor the downlink control channel based on a timer, where the timer is activated in a first symbol after the scheduled transmission opportunity, and output, over the first interface to the UE 115 on the downlink control channel, a second DCI message requesting transmission of at least a portion of the feedback information for the downlink data message based on the determined active time for the UE 115 to monitor the downlink control channel and identifying the failure to successfully receive the feedback message.

Figure 9:
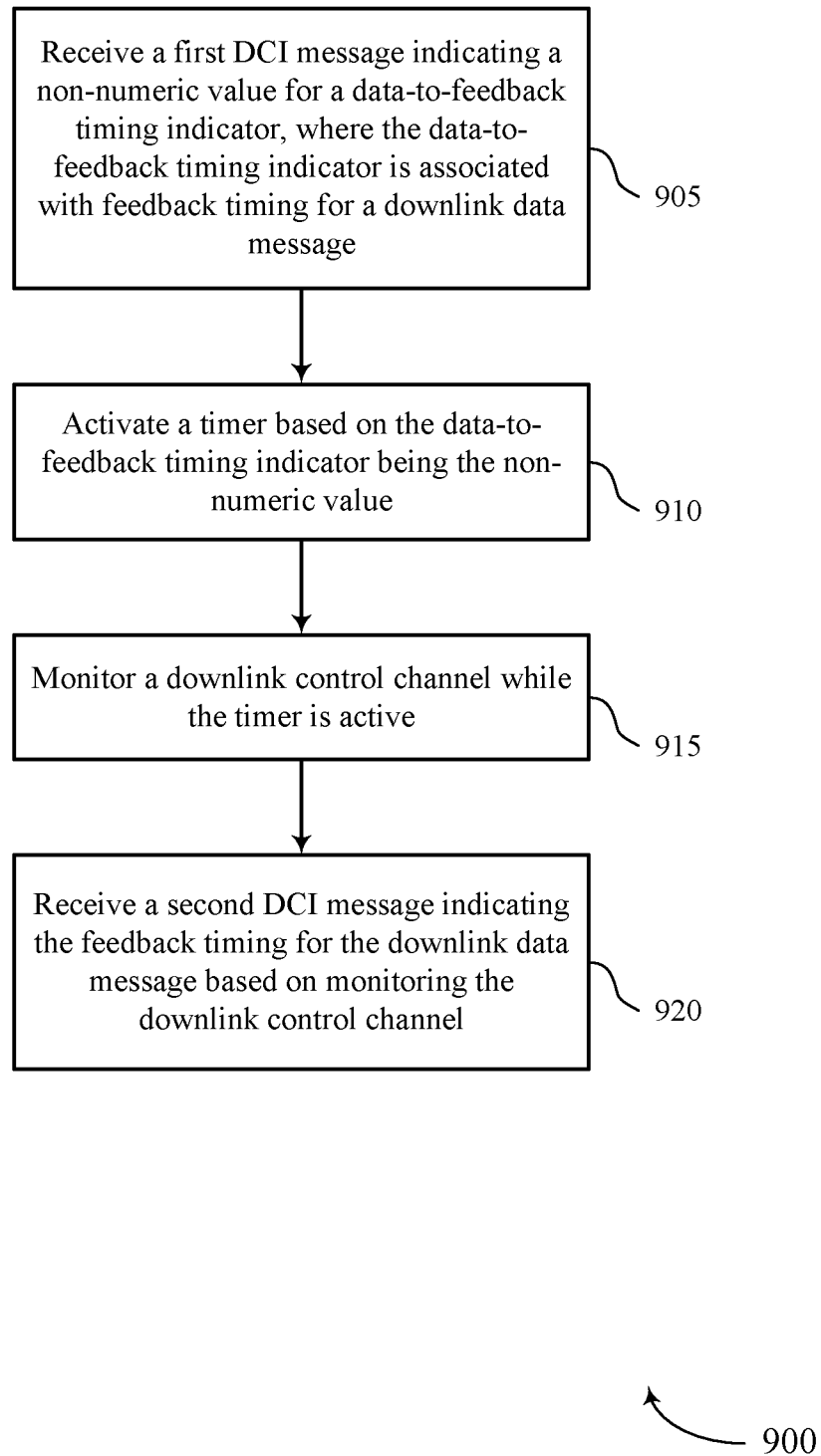
FIGS. 9-14 show flowcharts illustrating example methods for handling HARQ with DRX operations.

FIG. 9 shows a flowchart illustrating an example method 900 for handling HARQ with DRX operations. The operations of the method 900 may be implemented by a UE 115 or its components as described herein. For example, the operations of the method 900 may be performed by a communications manager, a timer manager, or both as described with reference to FIG. 7. In some implementations, a UE 115 may execute a set of instructions to control the functional elements of the UE 115 to perform the functions described below. Additionally, or alternatively, a UE 115 may perform aspects of the functions described below using special-purpose hardware.

At 905, the UE 115 may receive a first DCI message indicating a non-numeric value for a data-to-feedback timing indicator, where the first DCI message schedules a downlink data message and the data-to-feedback timing indicator is associated with feedback timing for the downlink data message. The operations of 905 may be performed according to the methods described herein.

At 910, the UE 115 may activate a timer based on receiving the first DCI message and based on the data-to-feedback timing indicator being the non-numeric value. The operations of 910 may be performed according to the methods described herein. At 915, the UE 115 may monitor a downlink control channel while the timer is active. The operations of 915 may be performed according to the methods described herein.

At 920, the UE 115 may receive a second DCI message indicating the feedback timing for the downlink data message based on monitoring the downlink control channel. The operations of 920 may be performed according to the methods described herein.

Figure 10:
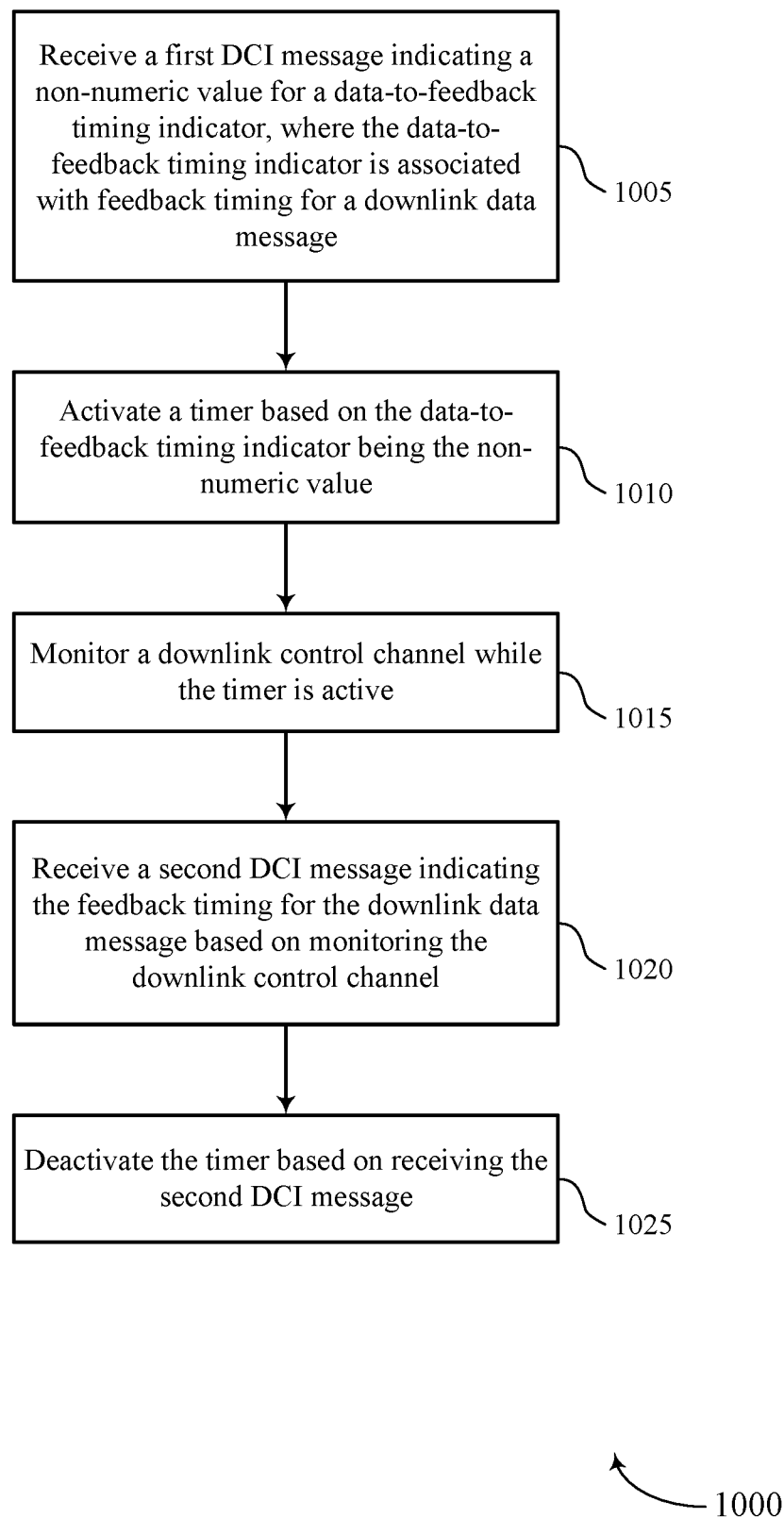

FIG. 10 shows a flowchart illustrating an example method 1000 for handling HARQ with DRX operations. The operations of the method 1000 may be implemented by a UE 115 or its components as described herein. For example, the operations of the method 1000 may be performed by a communications manager, a timer manager, or both as described with reference to FIG. 7. In some implementations, a UE 115 may execute a set of instructions to control the functional elements of the UE 115 to perform the functions described below. Additionally, or alternatively, a UE 115 may perform aspects of the functions described below using special-purpose hardware.

At 1005, the UE 115 may receive a first DCI message indicating a non-numeric value for a data-to-feedback timing indicator, where the first DCI message schedules a downlink data message and the data-to-feedback timing indicator is associated with feedback timing for the downlink data message. The operations of 1005 may be performed according to the methods described herein.

At 1010, the UE 115 may activate a timer based on receiving the first DCI message and on the data-to-feedback timing indicator being the non-numeric value. The operations of 1010 may be performed according to the methods described herein. At 1015, the UE 115 may monitor a downlink control channel while the timer is active. The operations of 1015 may be performed according to the methods described herein.

At 1020, the UE 115 may receive a second DCI message indicating the feedback timing for the downlink data message based on monitoring the downlink control channel. The operations of 1020 may be performed according to the methods described herein. At 1025, the UE 115 may deactivate the timer based on receiving the second downlink control information message indicating the feedback timing for the downlink data message. The operations of 1025 may be performed according to the methods described herein.

Figure 11:
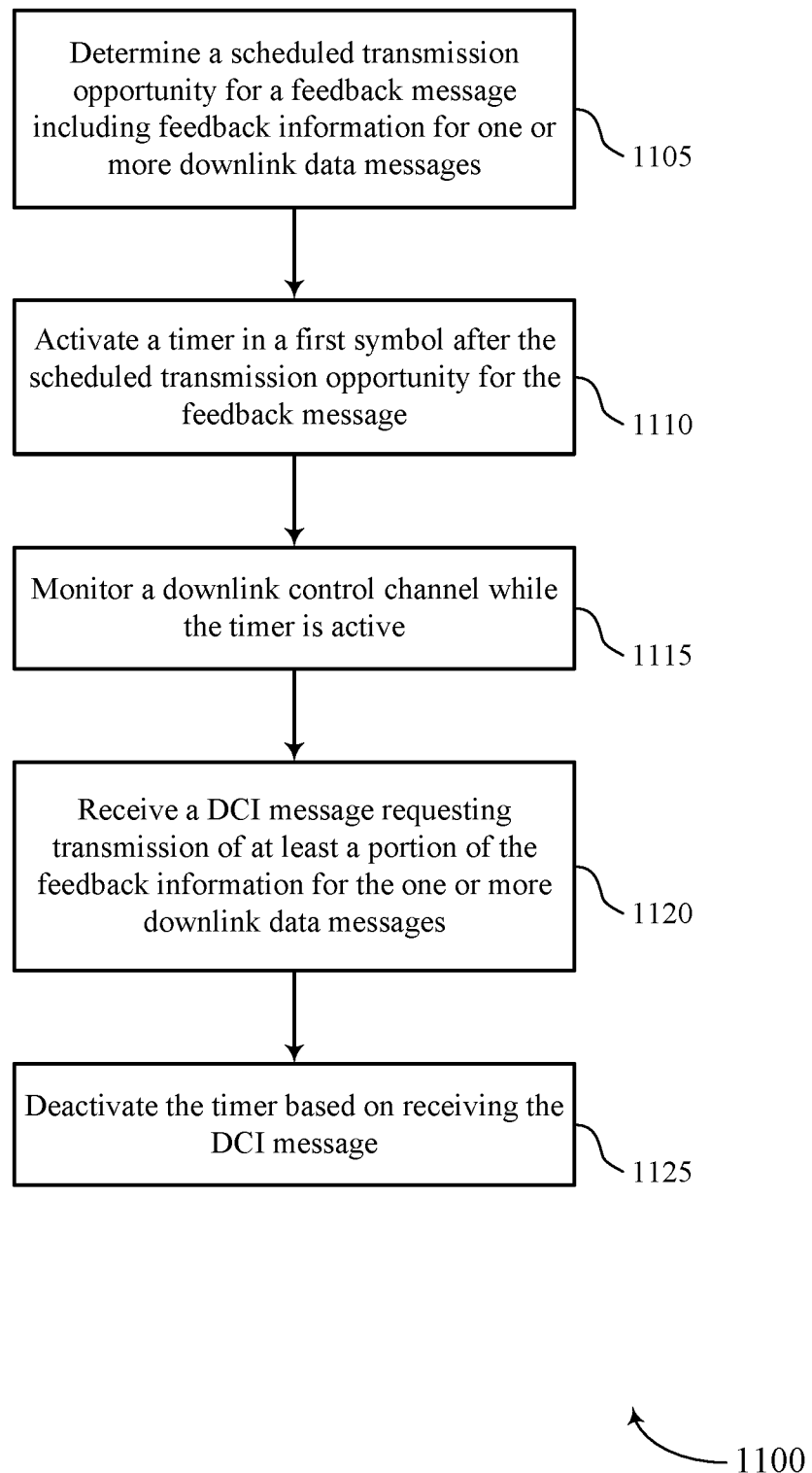

FIG. 11 shows a flowchart illustrating an example method 1100 for handling HARQ with DRX operations. The operations of the method 1100 may be implemented by a UE 115 or its components as described herein. For example, the operations of the method 1100 may be performed by a communications manager, a timer manager, or both as described with reference to FIG. 7. In some implementations, a UE 115 may execute a set of instructions to control the functional elements of the UE 115 to perform the functions described below. Additionally, or alternatively, a UE 115 may perform aspects of the functions described below using special-purpose hardware.

At 1105, the UE 115 may determine a scheduled transmission opportunity for a feedback message including feedback information for one or more downlink data messages. The operations of 1105 may be performed according to the methods described herein. At 1110, the UE 115 may activate a timer in a first symbol after the scheduled transmission opportunity for the feedback message. The operations of 1110 may be performed according to the methods described herein.

At 1115, the UE 115 may monitor a downlink control channel while the timer is active. The operations of 1115 may be performed according to the methods described herein. At 1120, the UE 115 may receive a DCI message requesting transmission of at least a portion of the feedback information for the one or more downlink data messages. The operations of 1120 may be performed according to the methods described herein. At 1125, the UE 115 may deactivate the timer based on receiving the DCI message. The operations of 1125 may be performed according to the methods described herein.

Figure 12:
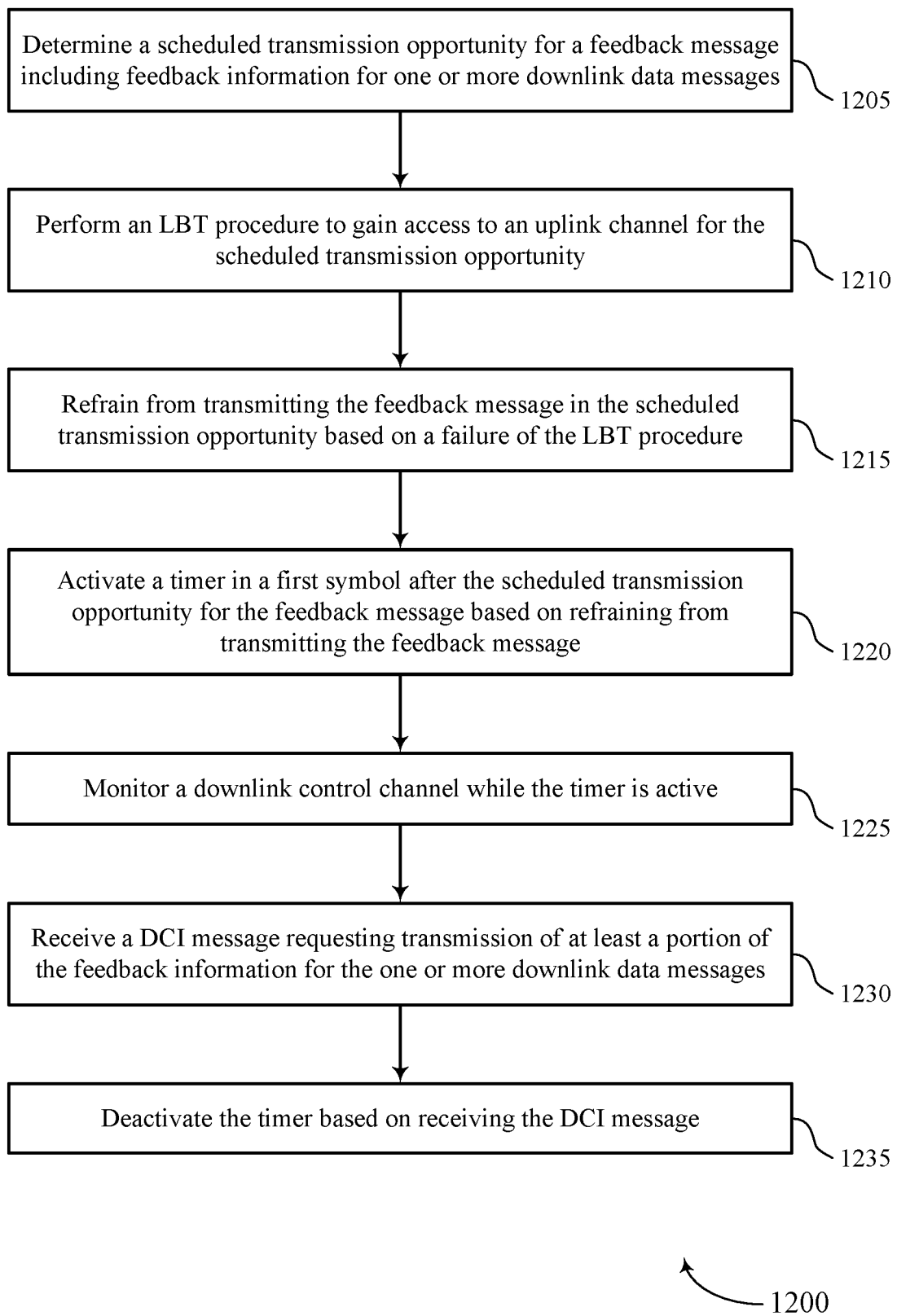

FIG. 12 shows a flowchart illustrating an example method 1200 for handling HARQ with DRX operations. The operations of the method 1200 may be implemented by a UE 115 or its components as described herein. For example, the operations of the method 1200 may be performed by a communications manager, a timer manager, or both as described with reference to FIG. 7. In some implementations, a UE 115 may execute a set of instructions to control the functional elements of the UE 115 to perform the functions described below. Additionally, or alternatively, a UE 115 may perform aspects of the functions described below using special-purpose hardware.

At 1205, the UE 115 may determine a scheduled transmission opportunity for a feedback message including feedback information for one or more downlink data messages. The operations of 1205 may be performed according to the methods described herein. At 1210, the UE 115 may perform an LBT procedure to gain access to an uplink channel for the scheduled transmission opportunity. The operations of 1210 may be performed according to the methods described herein. At 1215, the UE 115 may refrain from transmitting the feedback message in the scheduled transmission opportunity based on a failure of the LBT procedure. The operations of 1215 may be performed according to the methods described herein. At 1220, the UE 115 may activate a timer in a first symbol after the scheduled transmission opportunity for the feedback message based on refraining from transmitting the feedback message in the scheduled transmission opportunity. The operations of 1220 may be performed according to the methods described herein.

At 1225, the UE 115 may monitor a downlink control channel while the timer is active. The operations of 1225 may be performed according to the methods described herein. At 1230, the UE 115 may receive a DCI message requesting transmission of at least a portion of the feedback information for the one or more downlink data messages. The operations of 1230 may be performed according to the methods described herein. At 1235, the UE may deactivate the timer based on receiving the DCI message. The operations of 1235 may be performed according to the methods described herein.

Figure 13:
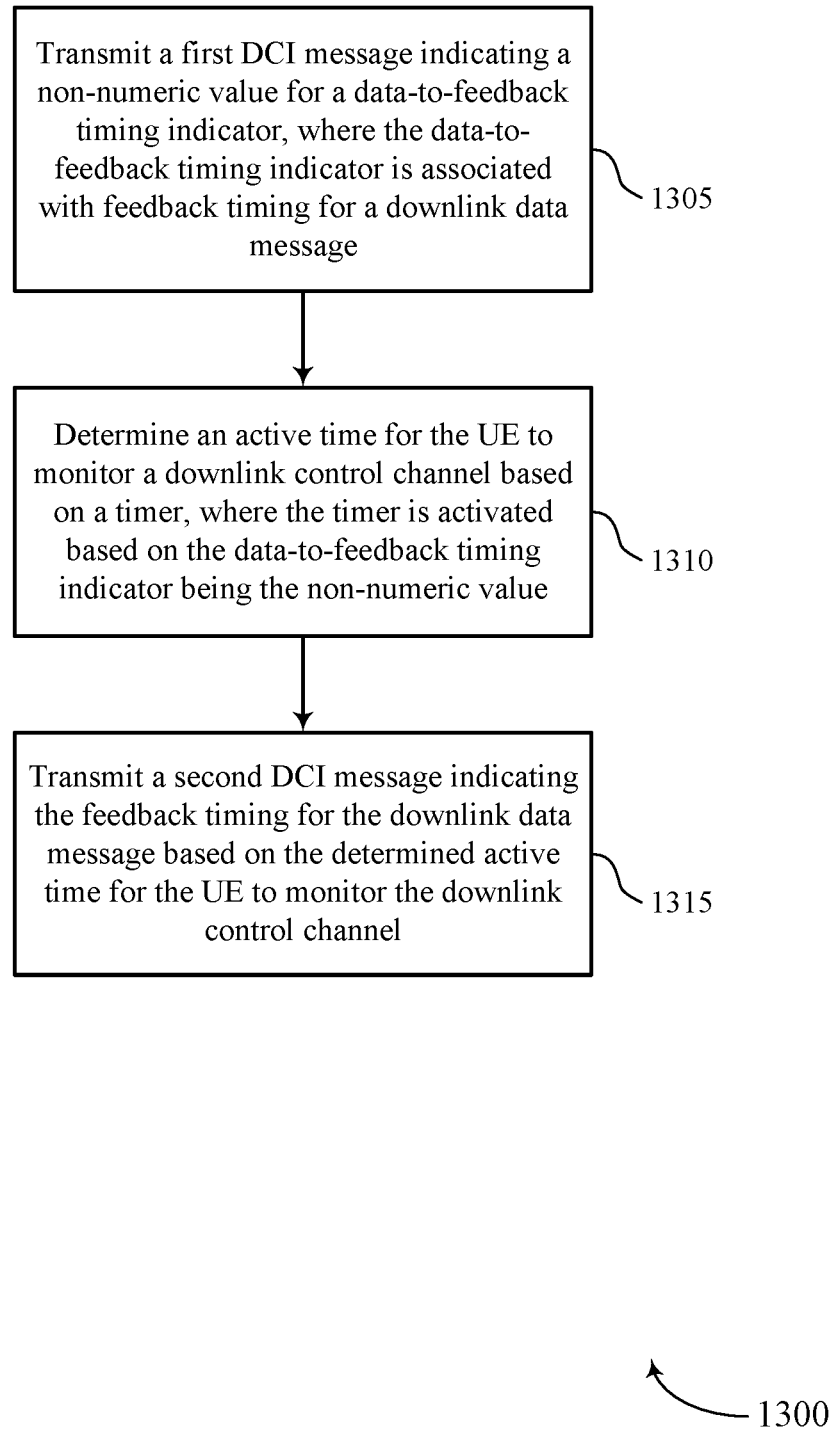

FIG. 13 shows a flowchart illustrating an example method 1300 for handling HARQ with DRX operations. The operations of the method 1300 may be implemented by a base station 105 or its components as described herein. For example, the operations of the method 1300 may be performed by a communications manager as described with reference to FIG. 8. In some implementations, a base station 105 may execute a set of instructions to control the functional elements of the base station 105 to perform the functions described below. Additionally, or alternatively, a base station 105 may perform aspects of the functions described below using special-purpose hardware.

At 1305, the base station 105 may transmit, to a UE 115 on a downlink control channel, a first DCI message indicating a non-numeric value for a data-to-feedback timing indicator, where the first DCI message schedules a downlink data message and the data-to-feedback timing indicator is associated with feedback timing for the downlink data message. The operations of 1305 may be performed according to the methods described herein.

At 1310, the base station 105 may determine an active time for the UE 115 to monitor the downlink control channel based on a timer, where the timer is activated based on the first DCI message and on the data-to-feedback timing indicator being the non-numeric value. The operations of 1310 may be performed according to the methods described herein.

At 1315, the base station 105 may transmit, to the UE 115 on the downlink control channel, a second DCI message indicating the feedback timing for the downlink data message based on the determined active time for the UE 115 to monitor the downlink control channel. The operations of 1315 may be performed according to the methods described herein.

Figure 14:
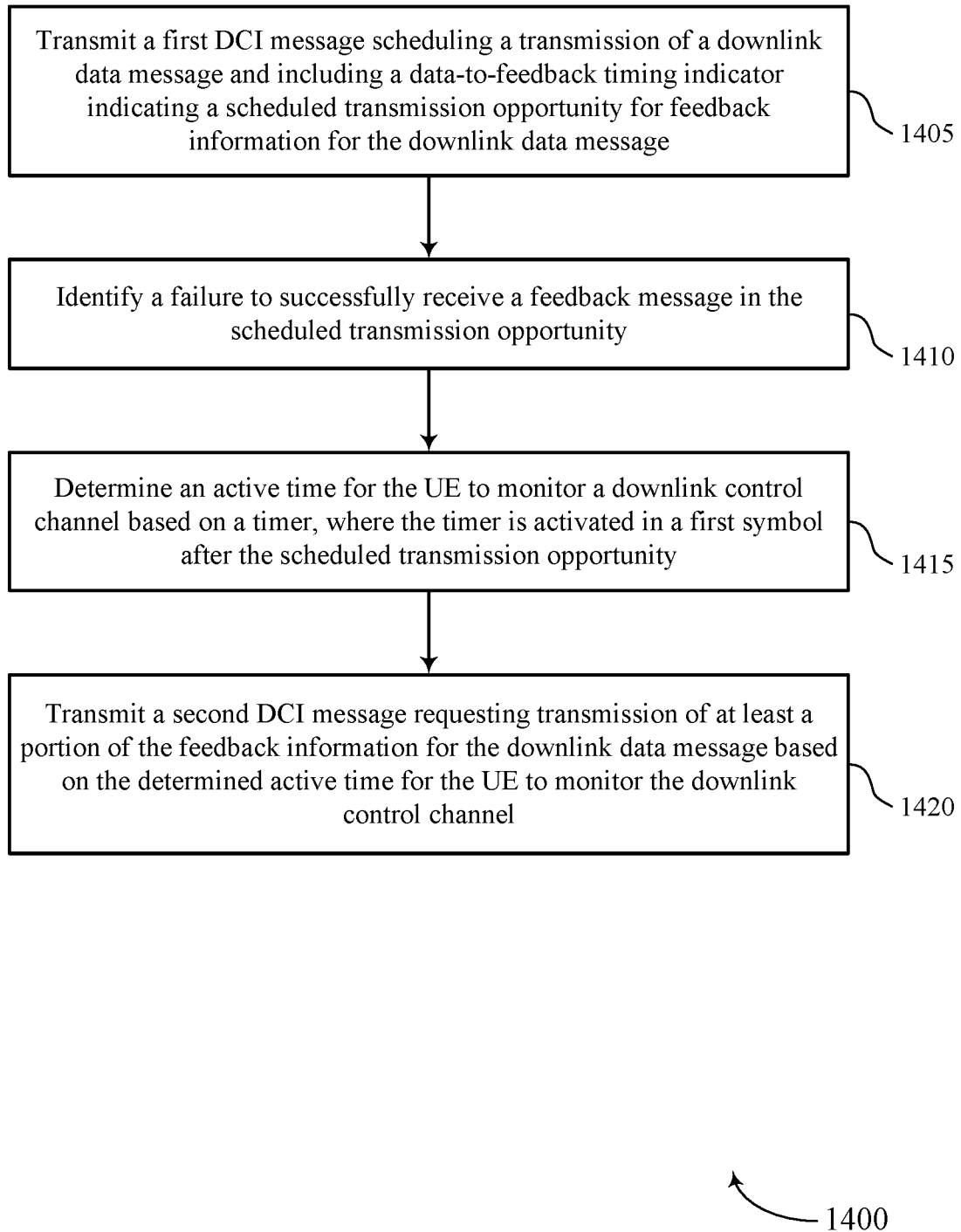

FIG. 14 shows a flowchart illustrating an example method 1400 for handling HARQ with DRX operations. The operations of the method 1400 may be implemented by a base station 105 or its components as described herein. For example, the operations of the method 1400 may be performed by a communications manager as described with reference to FIG. 8. In some implementations, a base station 105 may execute a set of instructions to control the functional elements of the base station 105 to perform the functions described below. Additionally, or alternatively, a base station 105 may perform aspects of the functions described below using special-purpose hardware.

At 1405, the base station 105 may transmit, to a UE 115 on a downlink control channel, a first DCI message scheduling a transmission of a downlink data message and including a data-to-feedback timing indicator corresponding to the downlink data message and indicating a scheduled transmission opportunity. The operations of 1405 may be performed according to the methods described herein.

At 1410, the base station 105 may identify a failure to successfully receive a feedback message including feedback information for the downlink data message in the scheduled transmission opportunity. The operations of 1410 may be performed according to the methods described herein.

At 1415, the base station 105 may determine an active time for the UE 115 to monitor the downlink control channel based on a timer, where the timer is activated in a first symbol after the scheduled transmission opportunity. The operations of 1415 may be performed according to the methods described herein.

At 1420, the base station 105 may transmit, to the UE 115 on the downlink control channel, a second DCI message requesting transmission of at least a portion of the feedback information for the downlink data message based on the determined active time for the UE to monitor the downlink control channel and identifying the failure to successfully receive the feedback message. The operations of 1420 may be performed according to the methods described herein.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An apparatus for wireless communications, comprising:
   a processor;
   memory coupled with the processor; and
   instructions stored in the memory and executable by the processor to cause the apparatus to:
      obtain a first downlink control information (DCI) message indicating a non-numeric value for a data-to-feedback timing indicator, wherein the first DCI message schedules a downlink data message and the data-to-feedback timing indicator is associated with feedback timing for the downlink data message, and wherein the non-numeric value is associated with a postponement of feedback transmission for the downlink data message;
      activate a timer in a first symbol after the scheduled downlink data message based at least in part on the first DCI message and on the data-to-feedback timing indicator being the non-numeric value;
      monitor a downlink control channel while the timer is active; and
      obtain a second DCI message different from the first DCI message, the second DCI message indicating the feedback timing for the downlink data message based at least in part on monitoring the downlink control channel.

2. The apparatus of claim 1, wherein:
   the timer comprises a retransmission timer for downlink retransmissions and is associated with a hybrid automatic repeat request (HARD) process corresponding to the downlink data message.

3. The apparatus of claim 2, wherein:
   the timer comprises a drx-RetransmissionTimerDL.

4. The apparatus of claim 1, wherein the instructions are further executable by the processor to cause the apparatus to:
   output a feedback message for the downlink data message according to the feedback timing indicated by the second DCI message; and
   activate a round-trip time timer in a first symbol after outputting the feedback message.

5. The apparatus of claim 4, wherein the instructions are further executable by the processor to cause the apparatus to:
   activate a retransmission timer in a first symbol after expiration of the round-trip time timer based at least in part on the feedback message comprising a negative acknowledgment (NACK) for the downlink data message; and
   monitor the downlink control channel while the retransmission timer is active.

6. The apparatus of claim 5, wherein:
   the round-trip time timer comprises a drx-HARQ-RTT-TimerDL; and
   the retransmission timer comprises a drx-Retransmission-TimerDL.

7. The apparatus of claim 1, wherein the instructions are further executable by the processor to cause the apparatus to:
   deactivate the timer based at least in part on obtaining the second DCI message indicating the feedback timing for the downlink data message.

8. The apparatus of claim 7, wherein:
   deactivating the timer comprises deactivating the timer in a first symbol after obtaining the second DCI message or in a first symbol after a feedback transmission corresponding to the feedback timing indicated by the second DCI message.

9. The apparatus of claim 1, wherein the instructions are further executable by the processor to cause the apparatus to:
obtain the downlink data message based at least in part on the first DCI message;
store feedback information for the downlink data message based at least in part on the first DCI message indicating the non-numeric value; and
output a feedback message comprising the feedback information for the downlink data message according to the feedback timing indicated by the second DCI message.

10. The apparatus of claim 9, wherein:
the feedback message comprises a hybrid automatic repeat request (HARQ) acknowledgment message.

11. The apparatus of claim 1, wherein the instructions are further executable by the processor to cause the apparatus to:
obtain a radio resource control (RRC) message indicating an active duration of the timer.

12. The apparatus of claim 11, wherein:
the active duration comprises a first active duration of the timer specific to obtaining DCI messages indicating non-numeric values; and
the RRC message further indicates a second active duration of the timer.

13. The apparatus of claim 1, wherein:
the timer is specific to a hybrid automatic repeat request (HARQ) process for the downlink data message.

14. The apparatus of claim 1, wherein the instructions are further executable by the processor to cause the apparatus to:
deactivate the timer based at least in part on the timer running for an active duration of the timer;
enter a low power mode based at least in part on deactivating the timer; and
refrain from monitoring the downlink control channel while in the low power mode.

15. The apparatus of claim 14, wherein:
entering the low power mode is further based at least in part on a user equipment (UE) being outside of an ON duration of a discontinuous reception (DRX) mode and each timer corresponding to monitoring the downlink control channel being deactivated.

16. The apparatus of claim 1, wherein the instructions are further executable by the processor to cause the apparatus to:
operate according to a discontinuous reception (DRX) mode; and
monitor the downlink control channel during an ON duration of the DRX mode, wherein the first DCI message is obtained based at least in part on monitoring the downlink control channel during the ON duration of the DRX cycle.

17. The apparatus of claim 1 included in a user equipment (UE).

18. An apparatus for wireless communications, comprising:
a processor;
memory coupled with the processor; and
instructions stored in the memory and executable by the processor to cause the apparatus to:
output a first downlink control information (DCI) message indicating a non-numeric value for a data-to-feedback timing indicator, wherein the first DCI message schedules a downlink data message and the data-to-feedback timing indicator is associated with feedback timing for the downlink data message, and wherein the non-numeric value is associated with a postponement of feedback transmission for the downlink data message;
determine an active time for a user equipment (UE) to monitor a downlink control channel based at least in part on a timer, wherein the timer is activated in a first symbol after the scheduled downlink data message based at least in part on the first DCI message and on the data-to-feedback timing indicator being the non-numeric value; and
output a second DCI message different from the first DCI message, the second DCI message indicating the feedback timing for the downlink data message based at least in part on the determined active time for the UE to monitor the downlink control channel.

19. The apparatus of claim 18, wherein:
the timer comprises a retransmission timer for downlink retransmissions and is associated with a hybrid automatic repeat request (HARD) process corresponding to the downlink data message.

20. The apparatus of claim 18, wherein the instructions are further executable by the processor to cause the apparatus to:
output a radio resource control (RRC) message indicating an active duration of the timer.

21. The apparatus of claim 20, wherein:
the active duration comprises a first active duration of the timer specific to obtaining DCI messages indicating non-numeric values; and
the RRC message further indicates a second active duration of the timer.

22. The apparatus of claim 18, wherein the instructions are further executable by the processor to cause the apparatus to:
output the downlink data message based at least in part on the first DCI message.

23. A method for wireless communications at an apparatus of a user equipment (UE), comprising:
receiving a first downlink control information (DCI) message indicating a non-numeric value for a data-to-feedback timing indicator, wherein the first DCI message schedules a downlink data message and the data-to-feedback timing indicator is associated with feedback timing for the downlink data message, and wherein the non-numeric value is associated with a postponement of feedback transmission for the downlink data message;
activating a timer in a first symbol after the scheduled downlink data message based at least in part on the first DCI message and on the data-to-feedback timing indicator being the non-numeric value;
monitoring a downlink control channel while the timer is active; and
receiving a second DCI message different from the first DCI message, the second DCI message indicating the feedback timing for the downlink data message based at least in part on monitoring the downlink control channel.

24. The method of claim 23, wherein:
the timer comprises a retransmission timer for downlink retransmissions and is associated with a hybrid automatic repeat request (HARD) process corresponding to the downlink data message.

25. The method of claim 23, further comprising:
transmitting a feedback message for the downlink data message according to the feedback timing indicated by the second DCI message; and activating a round-trip time timer in a first symbol after transmitting the feedback message.

26. The method of claim 25, further comprising:

activating a retransmission timer in a first symbol after expiration of the round-trip time timer based at least in part on the feedback message comprising a negative acknowledgment (NACK) for the downlink data message; and monitoring the downlink control channel while the retransmission timer is active.

27. A method for wireless communications at an apparatus of a base station, comprising:

transmitting, to a user equipment (UE) on a downlink control channel, a first downlink control information (DCI) message indicating a non-numeric value for a data-to-feedback timing indicator, wherein the first DCI message schedules a downlink data message and the data-to-feedback timing indicator is associated with feedback timing for the downlink data message, and wherein the non-numeric value is associated with a postponement of feedback transmission for the downlink data message;

determining an active time for the UE to monitor the downlink control channel based at least in part on a timer, wherein the timer is activated in a first symbol after the scheduled downlink data message based at least in part on the first DCI message and on the data-to-feedback timing indicator being the non-numeric value; and transmitting, to the UE on the downlink control channel, a second DCI message different from the first DCI message, the second DCI message indicating the feedback timing for the downlink data message based at least in part on the determined active time for the UE to monitor the downlink control channel.

28. The method of claim 27, wherein:

the timer comprises a retransmission timer for downlink retransmissions and is associated with a hybrid automatic repeat request (HARD) process corresponding to the downlink data message.

\* \* \* \* \*